(12) United States Patent
Rinzler et al.

(10) Patent No.: US 8,571,368 B2
(45) Date of Patent: Oct. 29, 2013

(54) OPTICAL FIBER CONFIGURATIONS FOR TRANSMISSION OF LASER ENERGY OVER GREAT DISTANCES

(75) Inventors: Charles C. Rinzler, Denver, CO (US); Mark S. Zediker, Castle Rock, CO (US)

(73) Assignee: Foro Energy, Inc., Littleton, CO (US)

( * ) Notice: Subject to any disclaimer, the term of this patent is extended or adjusted under 35 U.S.C. 154(b) by 95 days.

(21) Appl. No.: 12/840,978

(22) Filed: Jul. 21, 2010

(65) Prior Publication Data

US 2012/0020631 A1    Jan. 26, 2012

(51) Int. Cl.
*G02B 6/44* (2006.01)
*B23P 11/00* (2006.01)

(52) U.S. Cl.
USPC ............................ 385/109; 385/134; 29/428

(58) Field of Classification Search
USPC ........... 385/123, 124, 126, 127, 128, 100, 31, 385/32; 29/428
See application file for complete search history.

(56) References Cited

U.S. PATENT DOCUMENTS

| | | | |
|---|---|---|---|
| 914,636 A | 3/1909 | Case | |
| 2,548,463 A | 4/1951 | Blood | |
| 2,742,555 A | 4/1956 | Murray | |
| 3,122,212 A | 2/1964 | Karlovitz | |
| 3,383,491 A | 5/1968 | Muncheryan | |
| 3,461,964 A | 8/1969 | Venghiattis | |
| 3,493,060 A | 2/1970 | Van Dyk | |
| 3,503,804 A | 3/1970 | Schneider et al. | |
| 3,539,221 A | 11/1970 | Gladstone | |
| 3,544,165 A | 12/1970 | Snedden | |
| 3,556,600 A | 1/1971 | Shoupp et al. | |
| 3,574,357 A | 4/1971 | Alexandru et al. | |
| 3,586,413 A | 6/1971 | Adams | |
| 3,652,447 A | 3/1972 | Yant | |
| 3,693,718 A | 9/1972 | Stout | |
| 3,699,649 A | 10/1972 | McWilliams | |
| 3,802,203 A | 4/1974 | Ichise et al. | |
| 3,820,605 A | 6/1974 | Barber et al. | |
| 3,821,510 A | 6/1974 | Muncheryan | |
| 3,823,788 A | 7/1974 | Garrison et al. | |
| 3,871,485 A | 3/1975 | Keenan, Jr. | |
| 3,882,945 A | 5/1975 | Keenan, Jr. | |
| 3,938,599 A | 2/1976 | Horn | |

(Continued)

FOREIGN PATENT DOCUMENTS

EP    0 295 045 A2    12/1988
EP    0515983 A1    12/1992

(Continued)

OTHER PUBLICATIONS

Agrawal, Govind P., "Nonlinear Fiber Optics", Chap. 9, Fourth Edition, Academic Press copyright 2007, pp. 334-337.

(Continued)

*Primary Examiner* — Charlie Peng
(74) *Attorney, Agent, or Firm* — Glen P. Belvis; Steptoe & Johnson LLP

(57) ABSTRACT

There are provided optical fiber configurations that provide for the delivery of laser energy, and in particular, the transmission and delivery of high power laser energy over great distances. These configurations further are hardened to protect the optical fibers from the stresses and conditions of an intended application. The configurations provide means for determining the additional fiber length (AFL) need to obtain the benefits of such additional fiber, while avoiding bending losses.

181 Claims, 7 Drawing Sheets

(56) References Cited

U.S. PATENT DOCUMENTS

| | | |
|---|---|---|
| 3,960,448 A | 6/1976 | Schmidt et al. |
| 3,977,478 A | 8/1976 | Shuck |
| 3,992,095 A | 11/1976 | Jacoby et al. |
| 3,998,281 A | 12/1976 | Salisbury et al. |
| 4,019,331 A | 4/1977 | Rom et al. |
| 4,025,091 A | 5/1977 | Zeile, Jr. |
| 4,026,356 A | 5/1977 | Shuck |
| 4,046,191 A | 9/1977 | Neath |
| 4,047,580 A | 9/1977 | Yahiro et al. |
| 4,057,118 A | 11/1977 | Ford |
| 4,061,190 A | 12/1977 | Bloomfield |
| 4,066,138 A | 1/1978 | Salisbury et al. |
| 4,090,572 A | 5/1978 | Welch |
| 4,113,036 A | 9/1978 | Stout |
| 4,125,757 A | 11/1978 | Ross |
| 4,151,393 A | 4/1979 | Fenneman et al. |
| 4,162,400 A | 7/1979 | Pitts, Jr. |
| 4,189,705 A | 2/1980 | Pitts, Jr. |
| 4,194,536 A | 3/1980 | Stine et al. |
| 4,199,034 A | 4/1980 | Salisbury et al. |
| 4,227,582 A | 10/1980 | Price |
| 4,228,856 A | 10/1980 | Reale |
| 4,243,298 A | 1/1981 | Kao et al. |
| 4,249,925 A * | 2/1981 | Kawashima et al. ............ 65/430 |
| 4,252,015 A | 2/1981 | Harbon et al. |
| 4,256,146 A | 3/1981 | Genini et al. |
| 4,266,609 A | 5/1981 | Rom et al. |
| 4,280,535 A | 7/1981 | Willis |
| 4,281,891 A | 8/1981 | Shinohara et al. |
| 4,282,940 A | 8/1981 | Salisbury et al. |
| 4,332,401 A | 6/1982 | Stephenson et al. |
| 4,336,415 A | 6/1982 | Walling |
| 4,340,245 A | 7/1982 | Stalder |
| 4,367,917 A | 1/1983 | Gray |
| 4,370,886 A | 2/1983 | Smith, Jr. et al. |
| 4,374,530 A | 2/1983 | Walling |
| 4,375,164 A | 3/1983 | Dodge et al. |
| 4,389,645 A | 6/1983 | Wharton |
| 4,415,184 A | 11/1983 | Stephenson et al. |
| 4,417,603 A | 11/1983 | Argy |
| 4,436,177 A | 3/1984 | Elliston |
| 4,444,420 A | 4/1984 | McStravick et al. |
| 4,453,570 A | 6/1984 | Hutchison |
| 4,459,731 A | 7/1984 | Hutchison |
| 4,477,106 A | 10/1984 | Hutchison |
| 4,504,112 A | 3/1985 | Gould et al. |
| 4,522,464 A | 6/1985 | Thompson et al. |
| 4,531,552 A | 7/1985 | Kim |
| 4,533,814 A | 8/1985 | Ward |
| 4,565,351 A | 1/1986 | Conti et al. |
| 4,662,437 A | 5/1987 | Renfro |
| 4,694,865 A | 9/1987 | Tauschmann |
| 4,725,116 A | 2/1988 | Spencer et al. |
| 4,741,405 A | 5/1988 | Moeny et al. |
| 4,744,420 A | 5/1988 | Patterson et al. |
| 4,770,493 A | 9/1988 | Ara et al. |
| 4,793,383 A | 12/1988 | Gyory et al. |
| 4,830,113 A | 5/1989 | Geyer |
| 4,860,654 A | 8/1989 | Chawla et al. |
| 4,860,655 A | 8/1989 | Chawla |
| 4,872,520 A | 10/1989 | Nelson |
| 4,924,870 A | 5/1990 | Wlodarczyk et al. |
| 4,952,771 A | 8/1990 | Wrobel |
| 4,989,236 A | 1/1991 | Myllymäki |
| 4,997,250 A | 3/1991 | Ortiz, Jr. |
| 5,003,144 A | 3/1991 | Lindroth et al. |
| 5,004,166 A | 4/1991 | Sellar |
| 5,033,545 A | 7/1991 | Sudol |
| 5,049,738 A | 9/1991 | Gergely et al. |
| 5,084,617 A | 1/1992 | Gergely |
| 5,086,842 A | 2/1992 | Cholet |
| 5,093,880 A | 3/1992 | Matsuda et al. |
| 5,107,936 A | 4/1992 | Foppe |
| 5,121,872 A | 6/1992 | Legget |
| 5,125,061 A | 6/1992 | Marlier et al. |
| 5,125,063 A | 6/1992 | Panuska et al. |
| 5,128,882 A | 7/1992 | Cooper et al. |
| 5,140,664 A | 8/1992 | Bosisio et al. |
| 5,163,321 A | 11/1992 | Perales |
| 5,168,940 A | 12/1992 | Foppe |
| 5,172,112 A | 12/1992 | Jennings |
| 5,182,785 A | 1/1993 | Savegh et al. |
| 5,212,755 A | 5/1993 | Holmberg |
| 5,226,107 A | 7/1993 | Stern et al. |
| 5,269,377 A | 12/1993 | Martin |
| 5,285,204 A | 2/1994 | Sas-Jaworsky |
| 5,348,097 A | 9/1994 | Giannesini et al. |
| 5,351,533 A | 10/1994 | Macadam et al. |
| 5,353,875 A | 10/1994 | Schultz et al. |
| 5,355,967 A | 10/1994 | Mueller et al. |
| 5,356,081 A | 10/1994 | Sellar |
| 5,396,805 A | 3/1995 | Surjaatmadja |
| 5,397,372 A | 3/1995 | Partus et al. |
| 5,411,081 A | 5/1995 | Moore et al. |
| 5,411,085 A | 5/1995 | Moore et al. |
| 5,411,105 A | 5/1995 | Gray |
| 5,413,045 A | 5/1995 | Miszewski |
| 5,413,170 A | 5/1995 | Moore |
| 5,419,188 A | 5/1995 | Rademaker et al. |
| 5,423,383 A | 6/1995 | Pringle |
| 5,425,420 A | 6/1995 | Pringle |
| 5,434,944 A * | 7/1995 | Kerry et al. ................... 385/135 |
| 5,435,351 A | 7/1995 | Head |
| 5,435,395 A | 7/1995 | Connell |
| 5,463,711 A | 10/1995 | Chu |
| 5,465,793 A | 11/1995 | Pringle |
| 5,469,878 A | 11/1995 | Pringle |
| 5,479,860 A | 1/1996 | Ellis |
| 5,483,988 A | 1/1996 | Pringle |
| 5,488,992 A | 2/1996 | Pringle |
| 5,500,768 A | 3/1996 | Doggett et al. |
| 5,503,014 A | 4/1996 | Griffith |
| 5,503,370 A | 4/1996 | Newman et al. |
| 5,505,259 A | 4/1996 | Wittrisch et al. |
| 5,515,926 A | 5/1996 | Boychuk |
| 5,526,887 A | 6/1996 | Vestavik |
| 5,561,516 A | 10/1996 | Noble et al. |
| 5,566,764 A | 10/1996 | Elliston |
| 5,573,225 A | 11/1996 | Boyle et al. |
| 5,574,815 A | 11/1996 | Kneeland |
| 5,577,560 A | 11/1996 | Coronado et al. |
| 5,586,609 A | 12/1996 | Schuh |
| 5,599,004 A | 2/1997 | Newman et al. |
| 5,615,052 A | 3/1997 | Doggett |
| 5,638,904 A | 6/1997 | Misselbrook et al. |
| 5,655,745 A | 8/1997 | Morrill |
| 5,692,087 A | 11/1997 | Partus et al. |
| 5,694,408 A | 12/1997 | Bott et al. |
| 5,707,939 A | 1/1998 | Patel |
| 5,735,502 A | 4/1998 | Levett et al. |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,793,915 A * | 8/1998 | Joyce ............................... 385/91 |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,864,113 A | 1/1999 | Cossi |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,973,783 A * | 10/1999 | Goldner et al. ................ 356/465 |

(56) References Cited

U.S. PATENT DOCUMENTS

| | | | |
|---|---|---|---|
| 5,986,236 A | 11/1999 | Gainand et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,084,203 A | 7/2000 | Bonigen |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,200 B1 | 5/2001 | Crump et al. |
| 6,250,391 B1 | 6/2001 | Proudfoot |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,301,423 B1* | 10/2001 | Olson ................. 385/135 |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,355,928 B1 | 3/2002 | Skinner et al. |
| 6,356,683 B1* | 3/2002 | Hu et al. ................. 385/37 |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,424,784 B1* | 7/2002 | Olson ................. 385/135 |
| 6,426,479 B1 | 7/2002 | Bischof |
| 6,437,326 B1 | 8/2002 | Yamate et al. |
| 6,450,257 B1 | 9/2002 | Douglas |
| 6,463,198 B1 | 10/2002 | Coleman et al. |
| 6,494,259 B2 | 12/2002 | Surjaatmadja |
| 6,497,290 B1 | 12/2002 | Misselbrook et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Misselbrook et al. |
| 6,725,924 B2 | 4/2004 | Davidson et al. |
| 6,737,605 B1 | 5/2004 | Kern |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,944,380 B1 | 9/2005 | Hideo et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,099,533 B1 | 8/2006 | Chenard |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et al. |
| 7,249,633 B2 | 7/2007 | Ravensbergen et al. |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,310,466 B2 | 12/2007 | Fink et al. |
| 7,334,637 B2 | 2/2008 | Smith, Jr. |
| 7,337,660 B2 | 3/2008 | Ibrahim et al. |
| 7,362,422 B2 | 4/2008 | DiFoggio et al. |
| 7,372,230 B2 | 5/2008 | McKay |
| 7,394,064 B2 | 7/2008 | Marsh |
| 7,395,696 B2 | 7/2008 | Bissonnette et al. |
| 7,395,866 B2 | 7/2008 | Milberger et al. |
| 7,416,032 B2 | 8/2008 | Moeny et al. |
| 7,416,258 B2 | 8/2008 | Reed et al. |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,503,404 B2 | 3/2009 | McDaniel et al. |
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,535,628 B2 | 5/2009 | Tsuchiya et al. |
| 7,559,378 B2 | 7/2009 | Moeny |
| 7,587,111 B2* | 9/2009 | de Montmorillon et al. . 385/127 |
| 7,600,564 B2 | 10/2009 | Shampine et al. |
| 7,603,011 B2 | 10/2009 | Varkey et al. |
| 7,617,873 B2 | 11/2009 | Lovell et al. |
| 7,624,743 B2 | 12/2009 | Sarkar et al. |
| 7,628,227 B2 | 12/2009 | Marsh |
| 7,646,953 B2 | 1/2010 | Dowd et al. |
| 7,647,948 B2 | 1/2010 | Quigley et al. |
| 7,671,983 B2 | 3/2010 | Shammai et al. |
| 7,715,664 B1 | 5/2010 | Shou et al. |
| 7,720,323 B2 | 5/2010 | Yamate et al. |
| 7,769,260 B2 | 8/2010 | Hansen et al. |
| 7,802,384 B2 | 9/2010 | Kobayashi et al. |
| 7,834,777 B2 | 11/2010 | Gold |
| 7,848,368 B2 | 12/2010 | Gapontsev et al. |
| 7,900,699 B2 | 3/2011 | Ramos et al. |
| 7,938,175 B2 | 5/2011 | Skinner et al. |
| 8,011,454 B2 | 9/2011 | Castillo |
| 8,062,986 B2 | 11/2011 | Khrapko et al. |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |

(56) References Cited

U.S. PATENT DOCUMENTS

| | | |
|---|---|---|
| 8,175,433 B2 | 5/2012 | Caldwell et al. |
| 8,322,441 B2 | 12/2012 | Fenton |
| 8,385,705 B2 | 2/2013 | Overton et al. |
| 2002/0007945 A1 | 1/2002 | Neuroth et al. |
| 2002/0028287 A1 | 3/2002 | Kawada et al. |
| 2002/0039465 A1 | 4/2002 | Skinner |
| 2002/0189806 A1 | 12/2002 | Davidson et al. |
| 2003/0000741 A1 | 1/2003 | Rosa |
| 2003/0053783 A1 | 3/2003 | Shirasaki |
| 2003/0056990 A1 | 3/2003 | Oglesby |
| 2003/0085040 A1 | 5/2003 | Hemphill et al. |
| 2003/0094281 A1 | 5/2003 | Tubel |
| 2003/0132029 A1 | 7/2003 | Parker |
| 2003/0145991 A1 | 8/2003 | Olsen |
| 2003/0159283 A1 | 8/2003 | White |
| 2003/0160164 A1 | 8/2003 | Jones et al. |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammal et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2005/0007583 A1 | 1/2005 | DiFoggio |
| 2005/0012244 A1 | 1/2005 | Jones |
| 2005/0024716 A1 | 2/2005 | Nilsson et al. |
| 2005/0034857 A1 | 2/2005 | Defretin et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121235 A1 | 6/2005 | Larsen et al. |
| 2005/0189146 A1 | 9/2005 | Oglesby |
| 2005/0201652 A1 | 9/2005 | Ellwood, Jr. |
| 2005/0230107 A1 | 10/2005 | McDaniel et al. |
| 2005/0252286 A1 | 11/2005 | Ibrahim et al. |
| 2005/0263281 A1 | 12/2005 | Lovell et al. |
| 2005/0268704 A1 | 12/2005 | Bissonnette et al. |
| 2005/0269132 A1 | 12/2005 | Batarseh et al. |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0282645 A1 | 12/2005 | Bissonnette et al. |
| 2006/0005579 A1 | 1/2006 | Jacobsen et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0118303 A1 | 6/2006 | Schultz et al. |
| 2006/0137875 A1 | 6/2006 | Dusterhoft et al. |
| 2006/0173148 A1 | 8/2006 | Sasaki et al. |
| 2006/0185843 A1 | 8/2006 | Smith, Jr. |
| 2006/0191684 A1 | 8/2006 | Smith, Jr. |
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0257150 A1 | 11/2006 | Tsuchiya et al. |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Dale et al. |
| 2007/0081157 A1 | 4/2007 | Csutak et al. |
| 2007/0125163 A1 | 6/2007 | Dria et al. |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1* | 12/2007 | de Montmorillon et al. .. 385/127 |
| 2008/0023202 A1 | 1/2008 | Keatch et al. |
| 2008/0053702 A1 | 3/2008 | Smith |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0128123 A1 | 6/2008 | Gold |
| 2008/0138022 A1 | 6/2008 | Tassone |
| 2008/0165356 A1 | 7/2008 | Difoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1* | 11/2008 | Parker et al. .................. 385/128 |
| 2009/0020333 A1 | 1/2009 | Marsh |
| 2009/0029842 A1 | 1/2009 | Khrapko et al. |
| 2009/0031870 A1 | 2/2009 | O'Connor |
| 2009/0033176 A1 | 2/2009 | Huang et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | De Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler et al. |
| 2010/0044103 A1 | 2/2010 | Moxley et al. |
| 2010/0044104 A1 | 2/2010 | Zediker et al. |
| 2010/0044105 A1 | 2/2010 | Faircloth et al. |
| 2010/0044106 A1 | 2/2010 | Zediker et al. |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0114190 A1 | 5/2010 | Bendett et al. |
| 2010/0155059 A1 | 6/2010 | Ullah |
| 2010/0158457 A1 | 6/2010 | Drozd et al. |
| 2010/0158459 A1 | 6/2010 | Homa |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0290781 A1 | 11/2010 | Overton et al. |

(56) References Cited

U.S. PATENT DOCUMENTS

| | | |
|---|---|---|
| 2010/0326659 A1 | 12/2010 | Schultz et al. |
| 2010/0326665 A1 | 12/2010 | Redlinger et al. |
| 2011/0030367 A1 | 2/2011 | Dadd |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0122644 A1 | 5/2011 | Okuno |
| 2011/0127028 A1 | 6/2011 | Strickland |
| 2011/0135247 A1* | 6/2011 | Achara et al. ............ 385/12 |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0170563 A1 | 7/2011 | Heebner et al. |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Rudol Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1* | 1/2012 | Rinzler et al. ............ 385/109 |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | Dewitt et al. |
| 2012/0068086 A1 | 3/2012 | Dewitt et al. |
| 2012/0068523 A1 | 3/2012 | Bowles |
| 2012/0074110 A1 | 3/2012 | Zediker et al. |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0189258 A1 | 7/2012 | Overton et al. |
| 2012/0217015 A1 | 8/2012 | Zediker et al. |
| 2012/0217017 A1 | 8/2012 | Zediker |
| 2012/0217018 A1 | 8/2012 | Zediker et al. |
| 2012/0217019 A1 | 8/2012 | Zediker et al. |
| 2012/0239013 A1 | 9/2012 | Islam |
| 2012/0248078 A1 | 10/2012 | Zediker et al. |
| 2012/0255774 A1 | 10/2012 | Grubb et al. |
| 2012/0255933 A1 | 10/2012 | Mckay et al. |
| 2012/0261188 A1 | 10/2012 | Zediker et al. |
| 2012/0266803 A1 | 10/2012 | Zediker et al. |
| 2012/0267168 A1 | 10/2012 | Grubb et al. |
| 2012/0273269 A1 | 11/2012 | Rinzler et al. |
| 2012/0273470 A1 | 11/2012 | Zediker et al. |
| 2012/0275159 A1 | 11/2012 | Fraze et al. |
| 2013/0011102 A1 | 1/2013 | Rinzler et al. |

FOREIGN PATENT DOCUMENTS

| | | |
|---|---|---|
| EP | 0 565 287 A1 | 10/1993 |
| EP | 0 950 170 B1 | 9/2002 |
| FR | 2 716 924 | 9/1995 |
| GB | 1 284 454 | 8/1972 |
| GB | 2420358 B | 5/2006 |
| JP | 09072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

Damzen, M. J. et al., "Stimulated Brillion Scattering", Chapter 8—SBS in Optical Fibres, OP Publishing Ltd, Published by Institute of Physics, London, England, 2003, pp. 137-153.

Eichler, H.J. et al., "Stimulated Brillouin Scattering in Multimode Fibers for Optical Phase Conjugation", Optics Communications, vol. 208, 2002, pp. 427-431.

Kubacki, Emily et al., "Optics for Fiber Laser Applications", CVI Laser, LLC, Technical Reference Document #20050415, 2005, 5 pgs.

Lally, Evan M., "A Narrow-Linewidth Laser at 1550 nm Using the Pound-Drever-Hall Stabilization Technique", Thesis, submitted to Virginia Polytechnic Institute and State University, Blacksburg, Virginia, 2006, 92 pgs.

McElhenny, John E. et al., "Unique Characteristic Features of Stimulated Brillouin Scattering in Small-Core Photonic Crystal Fibers", J. Opt. Soc. Am. B, vol. 25, No. 4, 2008, pp. 582-593.

Mocofanescu, A. et al., "SBS threshold for single mode and multimode GRIN fibers in an all fiber configuration", Optics Express, vol. 13, No. 6, 2005, pp. 2019-2024.

Shannon, G. J. et al., "High power laser welding in hyperbaric gas and water environments", Journal of Laser Applications, vol. 9, 1997, pp. 129-136.

U.S. Appl. No. 12/706,576, filed Feb. 16, 2010, 28 pgs.

U.S. Appl. No. 12/840,978, filed Jul. 21, 2009, 61 pgs.

Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.

Agrawal Dinesh et al., Report on "Graded Steele-Tungsten Cardide/Cobalt-Diamond Systems Using Microwave Heating", Material Research Institute, Penn State University, Proceedings of the 2002 International Conference on Functionally Graded Materials, 2002, pp. 50-58.

Agrawal Dinesh et al., "Microstructural by TEM of WC/Co composites Prepared by Conventional and Microwave Processes", Materials Research Lab, The Pennsylvania State University, 15th International Plansee Seminar, vol. 2, , 2001, pp. 677-684.

Ai, H.A. et al., "Simulation of dynamic response of granite: A numerical approach of shock-induced damage beneath impact cra-

(56) References Cited

OTHER PUBLICATIONS ters", *International Journal of Impact Engineering*, vol. 33, 2006, pp. 1-10.

Anton, Richard J. et al., "Dynamic Vickers indentation of brittle materials", *Wear*, vol. 239, 2000, pp. 27-35.

Ashby, M. F. et al., "The Failure of Brittle Solids Containing Small Cracks Under Compressive Stress States", Acta Metall., vol. 34, No. 3, 1986, pp. 497-510.

Aydin, A. et al., "The Schmidt hammer in rock material characterization", *Engineering Geology*, vol. 81, 2005, pp. 1-14.

Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.

Bailo, El Tahir et al., "Spectral signatures and optic coefficients of surface and reservoir shales and limestones at COIL, $CO_2$ and Nd:YAG laser wavelengths", *Petroleum Engineering Department*, Colorado School of Mines, 2004, 13 pgs.

Baird, J. A. "Geodyn: A Geological Formation/Drillstring Dynamics Computer Program", *Society of Petroleum Engineers of AIME*, 1964, 9 pgs.

Baird, Jerold et al., Phase 1 Theoretical Description, A Geological Formation Drill String Dynamic Interaction Finite Element Program (GEODYN), *Sandia National Laboratories*, Report No. Sand-84/7101, 1984, 196 pgs.

Batarseh, S. et al. "Well Perforation Using High-Power Lasers", *Society of Petroleum Engineers*, SPE 84418, 2003, pp. 1-10.

BDM Corporation, Geothermal Completion Technology Life-Cycle Cost Model (GEOCOM), *Sandia National Laboratories*, for the U.S. Dept. of Energy, vols. 1 and 2, 1982, 222 pgs.

Beste, U. et al., "Micro-scratch evaluation of rock types-a means to comprehend rock drill wear", *Tribology International*, vol. 37, 2004, pp. 203-210.

Blackwell, B. F., "Temperature Profile in Semi-infinite Body With Exponential Source and Convective Boundary Condition", Journal of Heat Transfer, *Transactions of the ASME*, vol. 112, 1990, pp. 567-571.

Britz, Dieter, "Digital Simulation in Electrochemistry", *Lect. Notes Phys.*, vol. 666, 2005, pp. 103-117.

Browning, J. A. et al., "Recent Advances in Flame Jet Working of Minerals", *7th Symposium on Rock Mechanics*, Pennsylvania State Univ., 1965, pp. 281-313.

Cardenas, R., "Protected Polycrystalline Diamond Compact Bits for Hard Rock Drilling", Report No. DOE-99049-1381, *U.S. Department of Energy*, 2000, pp. 1-79.

Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.

Clegg, John et al., "Improved Optimisation of Bit Selection Using Mathematically Modelled Bit-Performance Indices", *IADC/SPE International 102287*, 2006, pp. 1-10.

Close, F. et al., "Successful Drilling of Basalt in a West of Shetland Deepwater Discovery", *SPE International 96575*, Society of Petroleum Engineers, 2006, pp. 1-10.

Cobern, Martin E., "Downhole Vibration Monitoring & Control System Quarterly Technical Report #1", *APS Technology, Inc.*, Quarterly Technical Report #1, DVMCS, 2003, pp. 1-15.

Cogotsi, G. A. et al., "Use of Nondestructive Testing Methods in Evaluation of Thermal Damage for Ceramics Under Conditions of Nonstationary Thermal Effects", *Institute of Strength Problems*, Academy of Sciences of the Ukrainian SSR, 1985, pp. 52-56.

Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.

Dahl, Filip et al., "Development of a new direct test method for estimating cutter life, based on the Sievers J miniature drill test", *Tunnelling and Underground Space Technology*, vol. 22, 2007, pp. 106-116.

Das, A. C. et al., "Acousto-ultrasonic study of thermal shock damage in castable refractory", *Journal of Materials Science Letters*, vol. 10, 1991, pp. 173-175.

De Guire, Mark R., "Thermal Expansion Coefficient (start)", *EMSE 201—Introduction to Materials Science & Engineering*, 2003, pp. 15.1-15.15.

Dinçer, Ismail et al., "Correlation between Schmidt hardness, uniaxial compressive strength and Young's modulus for andesites, basalts and tuffs", *Bull Eng Geol Env*, vol. 63, 2004, pp. 141-148.

Dunn, James C., "Geothermal Technology Development at Sandia", *Geothermal Research Division*, Sandia National Laboratories, 1987, pp. 1-6.

Eighmy, T. T. et al., "Micro Surface Characterizations: Implications for In Situ Remedial Methods in Fractured Rock", *Bedrock Bioremediation Center, Final Report, National Risk Management Research Laboratory, Office of Research and Development, U.S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", Mechanical Engineering Dept., *University of Southwestern Louisiana and Sandia National Laboratories*, 2000, pp. 1-10.

Ferro, D. et al., "Vickers and Knoop hardness of electron beam deposited ZrC and HfC thin films on titanium", *Surface & Coatings Technology*, vol. 200, 2006, pp. 4701-4707.

Figueroa, H. et al., "Rock removal using high power lasers for petroleum exploitation purposes", Gas Technology Institute, Colorado School of Mines, Halliburton Energy Services, *Argonne National Laboratory*, 2002, pp. 1-13.

Finger, John T. et al., "PDC Bit Research at Sandia National Laboratories", Sandia Report, Geothermal Research Division 6252, *Sandia National Laboratories*, SAND89-0079—UC-253, 1989, pp. 1-88.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", *Society of Petroleum Engineers*, SPE 97093, 2005, pp. 1-7.

Gahan, B. C. et al., "Laser Drilling: Determination of Energy Required to Remove Rock", *Society of Petroleum Engineers International*, SPE 71466, 2001, pp. 1-11.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Glowka, David A., "Design Considerations for a Hard-Rock PDC Drill Bit", Geothermal Technology Development Division 6241, *Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-Uc-66c, 1987, pp. 1-206.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

Glowka, David A. et al., "Progress in the Advanced Synthetic-Diamond Drill Bit Program", *Sandia National Laboratories*, SAND95-2617C, 1994, pp. 1-9.

Glowka, David A., "The Use of Single—Cutter Data in the Analysis of PDC Bit Designs", *61st Annual Technical Conference and Exhibition of Society of Petroleum Engineers*, 1986, pp. 1-37.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, Petroleum Engineering Department, *Colorado School of Mines*, 2001, pp. 1-157.

Gurarie, V. N., "Stress resistance parameters of brittle solids under laser/plasma pulse heating", *Materials Science and Engineering*, vol. A288, 2000, pp. 168-172.

(56) References Cited

OTHER PUBLICATIONS

Habib, P. et al., "The Influence of Residual Stresses on Rock Hardness", *Rock Mechanics*, vol. 6, 1974, pp. 15-24.
Hall, Kevin, "The role of thermal stress fatigue in the breakdown of rock in cold regions", *Geomorphology*, vol. 31, 1999, pp. 47-63.
Han, Wei, "Computational and experimental investigations of laser drilling and welding for microelectronic packaging", *Dorchester Polytechnic Institute*, A Dissertation submitted in May 2004, 242 pgs.
Hareland, G. et al., "Cutting Efficiency of a Single PDC Cutter on Hard Rock", *Journal of Canadian Petroleum Technology*, vol. 48, No. 6, 2009, pp. 1-6.
Hashida, T. et al., "Numerical simulation with experimental verification of the fracture behavior in granite under confining pressures based on the tension-softening model", *International Journal of Fracture*, vol. 59, 1993, pp. 227-244.
Healy, Thomas E., "Fatigue Crack Growth in Lithium Hydride", *Lawrence Livermore National Laboratory*, 1993, pp. 1-32.
Hettema, M. H. H. et al., "he Influence of Steam Pressure on Thermal Spalling of Sedimentary Rock: Theory and Experiments", *Int. J. Rock Mech. Min. Sci.*, vol. 35, No. 1, 1998, pp. 3-15.
Hibbs, Louis E. et al., "Wear Machanisms for Polycrystalline-Diamond Compacts as Utilized fro Drilling in Geothermal Environments", *Sandia National Laboratories*, for the United States Government, Report No. SAND-82-7213, 1983, 287 pgs.
Hoek, E., "Fracture of Anisotropic Rock", *Journal of the South African Institute of Mining and Metallurgy*, vol. 64, No. 10, 1964, pp. 501-523.
Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.
Huff, C. F. et al., "Recent Developments in Polycrystalline Diamond-Drill-Bit Design", Drilling Technology Division—4741, *Sandia National Laboratories*, 1980, pp. 1-29.
Jimeno, Carlos Lopez et al., Drilling and Blasting of Rocks, *a. a. Balkema Publishers*, 1995, 30 pgs.
Kahraman, S. et al., "Dominant rock properties affecting the penetration rate of percussive drills", *International Journal of Rock Mechanics and Mining Sciences*, 2003, vol. 40, pp. 711-723.
Kelsey, James R., "Drilling Technology/GDO", *Sandia National Laboratories*, SAND-85-1866c, DE85 017231, 1985, pp. 1-7.
Kerr, Callin Joe, "PDC Drill Bit Design and Field Application Evolution", *Journal of Petroleum Technology*, 1988, pp. 327-332.
Ketata, C. et al., "Knowledge Selection for Laser Drilling in the Oil and Gas Industry", *Computer Society*, 2005, pp. 1-6.
Khan, Ovais U. et al., "Laser heating of sheet metal and thermal stress development", *Journal of Materials Processing Technology*, vol. 155-156, 2004, pp. 2045-2050.
Kim, K. R. et al., "$CO_2$ laser-plume interaction in materials processing", *Journal of Applied Physics*, vol. 89, No. 1, 2001, pp. 681-688.
Klotz, K. et al., "Coatings with intrinsic stress profile: Refined creep analysis of (Ti,Al)N and cracking due to cyclic laser heating", *Thin Solid Films*, vol. 496, 2006, pp. 469-474.
Kobayashi, Toshio et al., "Drilling a 2-inch in Diameter Hole in Granites Submerged in Water by $CO_2$ Lasers", SPE International, *IADC 119914 Drilling Conference and Exhibition*, 2009, pp. 1-11.
Kujawski, Daniel, "A fatigue crack driving force parameter with load ratio effects", *International Journal of Fatigue*, vol. 23, 2001, pp. S239-S246.
Labuz, J. F. et al., "Microrack-dependent fracture of damaged rock", *International Journal of Fracture*, vol. 51, 1991, pp. 231-240.
Lacy, Lewis L., "Dynamic Rock Mechanics Testing for Optimized Fracture Designs", Society of Petroleum Engineers International, *Annual Technical Conference and Exhibition*, 1997, pp. 23-36.
Lau, John H., "Thermal Fatigue Life Prediction of Flip Chip Solder Joints by Fracture Mechanics Method", *Engineering Fracture Mechanics*, vol. 45, No. 5, 1993, pp. 643-654.
Leong, K. H. et al., "Lasers and Beam Delivery for Rock Drilling", *Argonne National Laboratory*, ANL/TD/TM03-01, 2003, pp. 1-35.
Leung, M. et al., "Theoretical study of heat transfer with moving phase-change interface in thawing of frozen food", *Journal of Physics D: Applied Physics*, vol. 38, 2005, pp. 477-482.
Lima, R. S. et al., "Elastic Modulus Measurements via Laser-Ultrasonic and Knoop Indentation Techniques in Thermally Sprayed Coatings", *Journal of Thermal Spray Technology*, vol. 14(1), 2005, pp. 52-60.
Lin, Y. T., "The Impact of Bit Performance on Geothermal-Well Cost", *Sandia National Laboratories*, SAND-81-1470C, 1981, pp. 1-6.
Lomov, I. N. et al., "Explosion in the Granite Field: Hardening and Softening Behavior in Rocks", U.S. Department of Energy, *Lawrence Livermore National Laboratory*, 2001, pp. 1-7.
Long, S. G. et al., "Thermal fatigue of particle reinforced metal-matrix composite induced by laser heating and mechanical load", *Composites Science and Technology*, vol. 65, 2005, pp. 1391-1400.
Lyons, K. David et al., "Netl Extreme Drilling Laboratory Studies High Pressure High Temperature Drilling Phenomena", U.S. Department of Energy, *National Energy Technology Laboratory*, 2007, pp. 1-6.
Marshall, David B. et al., "Indentation of Brittle Materials", Microindentation Techniques in Materials Science and Engineering, ASTM STP 889; *American Society for Testing and Materials*, 1986, pp. 26-46.
Maurer, William C., "Advanced Drilling Techniques", published by Petroleum Publishing Co., copyright 1980, 26 pgs.
Maurer, William C., "Novel Drilling Techniques", published by Pergamon Press, UK, copyright 1968, pp. 1-64.
Mazerov, Katie, "Bigger coil sizes, hybrid rigs, rotary steerable advances push coiled tubing drilling to next level", *Drilling Contractor*, 2008, pp. 54-60.
Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.
Mensa-Wilmot, Graham et al., "Advanced Cutting Structure Improves PDC Bit Performance in Hard and Abrasive Drilling Environments", *Society of Petroleum Engineers International*, 2003, pp. 1-13.
Messaoud, Louafi, "Influence of Fluids on the Essential Parameters of Rotary Percussive Drilling", *Laboratoire d'Environnement (Tébessa)*, vol. 14, 2009, pp. 1-8.
Moradian, Z. A. et al., "Predicting the Uniaxial Compressive Strength and Static Young's Modulus of Intact Sedimentary Rocks Using the Ultrasonic Test", *International Journal of Geomechanics*, vol. 9, No. 1, 2009, pp. 14-19.
Muto, Shigeki et al., "Laser cutting for thick concrete by multi-pass technique", *Chinese Optics Letters*, vol. 5 Supplement, 2007, pp. S39-S41.
Naqvi, I. Z. et al., "Laser heating of multilayer assembly and stress levels: elasto-plastic consideration", *Heat and Mass Transfer*, vol. 40, 2003, pp. 25-32.
Nara, Y. et al., "Sub-critical crack growth in anisotropic rock", *International Journal of Rock Mechanics and Mining Sciences*, vol. 43, 2006, pp. 437-453.
Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.
O'Hare, Jim et al., "Design Index: A Systematic Method of PDC Drill-Bit Selection", *Society of Petroleum Engineers International*, IADC/SPC Drilling Conference, 2000, pp. 1-15.
Okon, P. et al., "Laser Welding of Aluminium Alloy 5083", *21st International Congress on Applications of Lasers and Electro-Optics*, 2002, pp. 1-9.
Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.
Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.

(56) References Cited

OTHER PUBLICATIONS

Ortiz, Blas et al., Improved Bit Stability Reduces Downhole Harmonics (Vibrations), *International Association of Drilling Contractors/Society of Petroleum Engineers Inc.*, 1996, pp. 379-389.

Palashchenko, Yuri A., "Pure Rolling of Bit Cones Doubles Performance", *I & Gas Journal*, vol. 106, 2008, 8 pgs.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, Richard A. et al., "Laser Drilling Effects of Beam Application Methods on Improving Rock Removal", *Society of Petroleum Engineers*, SPE 84353, 2003, pp. 1-7.

Pavlina, E. J. et al., "Correlation of Yield Strength and Tensile Strength with Hardness for Steels", *Journals of Materials Engineering and Performance*, vol. 17, No. 6, 2008, pp. 888-893.

Ping, Cao et al., "Testing study of subcritical crack growth rate and fracture toughness in different rocks", *Transactions of Nonferrous Metals Society of China*, vol. 16, 2006, pp. 709-714.

Plinninger, Ralf J. et al., "Predicting Tool Wear in Drill and Blast", *Tunnels & Tunneling International Magazine*, 2002, pp. 1-5.

Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert (ed.)*, VGE, 2004, pp. 1-6.

Polsky, Yarom et al., "Enhanced Geothermal Systems (EGS) Well Construction Technology Evaluation Report", *Sandia National Laboratories*, Sandia Report, SAND2008-7866, 2008, pp. 1-108.

Pooniwala, Shahvir, "Lasers: The Next Bit", *Society of Petroleum Engineers*, No. SPE 104223, 2006, 10 pgs.

Potyondy, D. O. et al., "A Bonded-particle model for rock", *International Journal of Rock Mechanics and Mining Sciences*, vol. 41, 2004, pp. 1329-1364.

Qixian, Luo et al., "Using compression wave ultrasonic transducers to measure the velocity of surface waves and hence determine dynamic modulus of elasticity for concrete", *Construction and Building Materials*, vol. 10, No. 4, 1996, pp. 237-242.

Radkte, Robert, "New High Strength and faster Drilling TSP Diamond Cutters", Report by *Technology International, Inc.*, DOE Award No. DE-FC26-97FT34368, 2006, 97 pgs.

Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.

Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.

Raymond, David W., "PDC Bit Testing At Sandia Reveals Influence of Chatter in Hard-Rock Drilling", *Geothermal Resources Council Monthly Bulletin*, SAND99-2655J, 1999, 7 pgs.

Rossmanith, H. P. et al., "Wave Propagation, Damage Evolution, and Dynamic Fracture Extension. Part I. Percussion Drilling", *Materials Science*, vol. 32, No. 3, 1996, pp. 350-358.

Sachpazis, C. I, M. Sc., Ph. D., "Correlating Schmidt Hardness With Compressive Strength and Young's Modulus of Carbonate Rocks", *International Association of Engineering Geology*, Bulletin, No. 42, 1990, pp. 75-83.

Sano, Osamu et al., "Acoustic Emission During Slow Crack Growth", Department Mining and Mineral Engineering, *NII-Electronic Library Service*, 1980, pp. 381-388.

Schormair, Nik et al., "The influence of anisotropy on hard rock drilling and cutting", The Geological Society of London, *IAEG*, Paper No. 491, 2006, pp. 1-11.

Shuja, S. Z. et al., "Laser heating of semi-infinite solid with consecutive pulses: Influence of materaial properties on temperature field", *Optics & Laser Technology*, vol. 40, 2008, pp. 472-480.

Smith, E., "Crack Propagation at a Constant Crack Tip Stress Intensity Factor", *Int. Journal of Fracture*, vol. 16, 1980, pp. R215-R218.

Solomon, A. D. et al., "Moving Boundary Problems in Phase Change Models Current Research Questions", *Engineering Physics and Mathematics Division*, ACM Signurn Newsletter, vol. 20, Issue 2, 1985, pp. 8-12.

Sousa, Luis M. O. et al., "Influence of microfractures and porosity on the physico-mechanical properties and weathering of ornamental granites", *Engineering Geology*, vol. 77, 2005, pp. 153-168.

Stone, Charles M. et al., "Qualification of a Computer Program for Drill String Dynamics", *Sandia National Laboratories*, SAND-85-0633C, 1985, pp. 1-20.

Takarli, Mokhfi et al., "Damage in granite under heating/cooling cycles and water freeze-thaw condition", *International Journal of Rock Mechanics and Mining Sciences*, vol. 45, 2008, pp. 1164-1175.

Tanaka, K. et al., "The Generalized Relationship Between the Parameters C and m of Paris' Law for Fatigue Crack Growth", *Scripta Metallurgica*, vol. 15, No. 3, 1981, pp. 259-264.

Tang, C. A. et al., "Coupled analysis of flow, stress and damage (FSD) in rock failure", *International Journal of Rock Mechanics and Mining Sciences*, vol. 39, 2002, pp. 477-489.

Thorsteinsson, Hildigunnur et al., "The Impacts of Drilling and Reservoir Technology Advances on EGS Exploitation", Proceedings, Thirty-Third Workshop on Geothermal Reservoir Engineering, *Institute for Sustainable Energy, Environment, and Economy (ISEEE)*, 2008, pp. 1-14.

U.S. Dept of Energy, "Chapter 6—Drilling Technology and Costs", from Report for the Future of Geothermal Energy, 2005, 53 pgs.

Varnado, S. G. et al., "The Design and Use of Polycrystalline Diamond Compact Drag Bits in the Geothermal Environment", *Society of Petroleum Engineers of AIME*, SPE 8378, 1979, pp. 1-11.

Wen-gui, Cao et al., "Damage constituitive model for strain-softening rock based on normal distribution and its parameter determination", *J. Cent. South Univ. Technol.*, vol. 14, No. 5, 2007, pp. 719-724.

Wiercigroch, M., "Dynamics of ultrasonic percussive drilling of hard rocks", *Journal of Sound and Vibration*, vol. 280, 2005, pp. 739-757.

Williams, R. E. et al., "Experiments in Thermal Spallation of Various Rocks", *Transactions of the ASME*, vol. 118, 1996, pp. 2-8.

Willis, David A. et al., "Heat transfer and phase change during picosecond laser ablation of nickel", *International Journal of Heat and Mass Transfer*, vol. 45, 2002, pp. 3911-3918.

Wong, Teng-fong et al., "Microcrack statistics, Weibull distribution and micromechanical modeling of compressive failure in rock", *Mechanics of Materials*, vol. 38, 2006, pp. 664-681.

Wood, Tom, "Dual Purpose COTD™ Rigs Establish New Operational Records", Treme Coil Drilling Corp., *Drilling Technology Without Borders*, 2009, pp. 1-18.

Xia, K. et al., "Effects of microstructures on dynamic compression of Barre granite", *International Journal of Rock Mechanics and Mining Sciences*, vol. 45, 2008. pp. 879-887, available at: www.sciencedirect.com.

Xu, Zhiyue et al., "Laser Spallation of Rocks for Oil Well Drilling", *Proceedings of the 23rd International Congress on Applications of Lasers and Electro-Optics*, 2004, pp. 1-6.

Xu, Z et al. "Modeling of Laser Spallation Drilling of Rocks fro gas- and Oilwell Drilling", *Society of Petroleum Engineers*, SPE 95746, 2005, pp. 1-6.

Xu, Z. et al., "Specific Energy for Laser Removal of Rocks", *Proceedings of The 20th International Congress on Applications of Lasers & Electro-Optics*, 2001, pp. 1-8.

Xu, Z. et al., "Specific energy for pulsed laser rock drilling", *Journal of Laser Applications*, vol. 15, No. 1, 2003, pp. 25-30.

Yamshchikov, V. S. et al., "An Evaluation of the Microcrack Density of Rocks by Ultrasonic Velocimetric Method", Moscow Mining Institute. (Translated from *Fiziko-Tekhnicheskie Problemy Razrabotki Poleznykh Iskopaemykh*), 1985, pp. 363-366.

Yilbas, B. S. et al., "Laser short pulse heating: Influence of pulse intensity on temperature and stress fields", *Applied Surface Science*, vol. 252, 2006, pp. 8428-8437.

Yilbas, B. S. et al., "Laser treatment of aluminum surface: Analysis of thermal stress field in the irradiated region", *Journal of Materials Processing Technology*, vol. 209, 2009, pp. 77-88.

(56) References Cited

OTHER PUBLICATIONS

Yilbas, B. S. et al., "Nano-second laser pulse heating and assisting gas jet considerations", *International Journal of Machine Tools & Manufacture*, vol. 40, 2000, pp. 1023-1038.
Yilbas, B. S. et al., "Repetitive laser pulse heating with a convective boundary condition at the surface", *Journal of Physics D: Applied Physics*, vol. 34, 2001, pp. 222-231.
Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.
Zeuch, D.H. et al., "Rock Breakage Mechanism Wirt a PDC Cutter", *Society of Petroleum Engineers, 60$^{th}$ Annual Technical Conference*, Las Vegas, Sep. 22-25, 1985, 11 pgs.
Zhai, Yue et al., "Dynamic failure analysis on granite under uniaxial impact compressive load", *Front. Archit. Civ. Eng. China*, vol. 2, No. 3, 2008, pp. 253-260.
Zhou, X.P., "Microcrack Interaction Brittle Rock Subjected to Uniaxial Tensile Loads", *Theoretical and Applied Fracture Mechanics*, vol. 47, 2007, pp. 68-76.
Zhou, Zehua et al., "A New Thermal-Shock-Resistance Model for Ceramics: Establishment and validation", *Materials Science and Engineering*, A 405, 2005, pp. 272-276.
Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.
Zhu, Dongming et al., "Investigation of thermal fatigue behavior of thermal barrier coating systems", *Surface and Coatings Technology*, vol. 94-95, 1997, pp. 94-101.
Zhu, Dongming et al., "Investigation of Thermal High Cycle and Low Cycle Fatigue Mechanisms of Thick Thermal Barrier Coatings", *National Aeronautics and Space Administration, Lewis Research Center*, Nasa/Tm-1998-206633, 1998, pp. 1-31.
Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.
International Search Report for PCT Application No. PCT/US09/54295, dated Apr. 26, 2010, 16 pgs.
A Built-for-Purpose Coiled Tubing Rig, by Schulumberger Wells,No. DE-PS26-03NT15474, 2006, 1 pg.
Diamond-Cutter Drill Bits, by Geothermal Energy Program, Office of Geothermal and Wind Technologies, 2000, 2 pgs.
Extreme Coil Drilling, by Extreme Drilling Corporation, 2009, 10 pgs.
IADC Dull Grading System for Fixed Cutter Bits, by Hughes Christensen, 1996, 14 pgs.
Percussion Drilling Manual, by Smith Tools, 2002, 67 pgs.
Simple Drilling Methods, WEDC Loughborough University, United Kingdom, 1995, 4 pgs.
International Search Report and Written Opinion for PCT App. No. PCT/US10/24368, dated Nov. 2, 2010, 16 pgs.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Acosta, A. et al., Paper from X Brazilian MRS meeting titled "Drilling Granite With Laser Light", X Encontro da SBPMat Granado-RS, Sep 2011, 4 pp. including pp. 56 and 59.
Ahmadi, M. et al., "The Effect of Interaction Time and Saturation of Rock on Specific Energy in ND:YAG Laser Perforating", *Optics and Laser Technology*, vol. 43, 2011, pp. 226-231.
Akhatov, I. et al., "Collapse and Rebound of a Laser-Induced Cavitation Bubble", *Physics of Fluids*, vol. 13, No. 10, Oct. 2001, pp. 2805-2819.
Albertson, M. L. et al., "Diffusion of Submerged Jets", a paper for the *American Society of Civil Engineers*, Nov. 5, 1852, pp. 1571-1596.

Al-Harthi, A. A. et al., "The Porosity and Engineering Properties of Vesicular Basalt in Saudi Arabia", *Engineering Geology*, vol. 54, 1999, pp. 313-320.
Anand, U. et al., "Prevention of Nozzle Wear in Abrasive Water Suspension Jets (AWSJ) Using Porous Lubricated Nozzles", *Transactions of the ASME*, vol. 125, Jan. 2003, pp. 168-181.
Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.
Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.
Antonucci, V. et al., "Numerical and Experimental Study of a Concentrated Indentation Force on Polymer Matrix Composites", an excerpt from the *Proceedings of the COMSOL Conference*, 2009, 4 pages.
Author unknown, "Standard Test Method for Thermal Conductivity of Solids by Means of the Guarded-Comparative-Longitudinal Heat Flow Technique, Standard under the fixed Designation E1225-09, ", published by ASTM International, 2009, pp. 1-9.
Atkinson, B. K., "Introduction to Fracture Mechanics and Its Geophysical Applications", *Fracture Mechanics of Rock*, 1987, pp. 1-26.
Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.
Aver, B. B. et al., "Porosity Dependence of the Elastic Modulus of Lithophysae-rich Tuff: Numerical and Experimental Investigations", *International Journal of Rock Mechanics & Mining Sciences*, vol. 40, 2003, pp. 919-928.
Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Batarseh, S. I. et al, "Innovation in Wellbore Perforation Using High-Power Laser", *International Petroleum Technology Conference*, IPTC No. 10981, Nov. 2005, 7 pages.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.
Baykasoglu, A. et al., "Prediction of Compressive and Tensile Strength of Limestone via Genetic Programming", *Expert Systems with Applications*, vol. 35, 2008, pp. 111-123.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Belyaev, V. V., "Spall Damage Modelling and Dynamic Fracture Specificities of Ceramics", *Journal of Materials Processing Technology*, vol. 32, 1992, pp. 135-144.
Benavente, D. et al., "The Combined Influence of Mineralogical, Hygric and Thermal Properties on the Durability of Porous Building Stones", *Eur. J. Mineral*, vol. 20, Aug. 2008, pp. 673-685.
Bieniawski, Z. T., "Mechanism of Brittle Fracture of Rock: Part I—Theory of the Fracture Process", *Int. J. Rock Mech. Min. Sci.*, vol. 4, 1967, pp. 395-406.
Bilotsky, Y. et al., "Modelling Multilayers Systems with Time-Depended Heaviside and New Transition Functions", excerpt from the Proceedings of the 2006 Nordic COMSOL Conference, 2006, 4 pages.
Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006, 27 pages.

(56) References Cited

OTHER PUBLICATIONS

Blackwell, D. D. et al., "Geothermal Resources in Sedimentary Basins", a presentation for the Geothermal Energy Generation in Oil and Gas Settings, Mar. 13, 2006, 28 pages.

Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.

Blomqvist, M. et al., "All-in-Quartz Optics for Low Focal Shifts", *SPIE Photonics West Conference* in San Francisco, Jan 2011, 12 pages.

Boechat, A. A. P. et al., "Bend Loss in Large Core Multimode Optical Fiber Beam Delivery Systems", *Applied Optics.*, vol. 30 No. 3, Jan. 20, 1991, pp. 321-327.

Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.

Brown, G., "Development, Testing and Track Record of Fiber-Optic, Wet-Mate, Connectors", *IEEE*, 2003, pp. 83-88.

Brujan, E. A. et al., "Dynamics of Laser-Induced Cavitation Bubbles Near an Elastic Boundar", *J. Fluid Mech.*, vol. 433, 2001, pp. 251-281.

Burdine, N. T., "Rock Failure Under Dynamic Loading Conditions", Society of Petroleum Engineers Journal, Mar. 1963, pp. 1-8.

Bybee, K., "Modeling Laser-Spallation Rock Drilling", *JPT*, an SPE available at www.spe.org/jpt, Feb. 2006, 2 pp. 62-63.

Bybee, Karen, highlight of "Drilling a Hole in Granite Submerged in Water by Use of CO2 Laser", an SPE available at www.spe.org/jpt, *JPT*, Feb. 2010, pp. 48, 50 and 51.

Cai, W. et al., "Strength of Glass from Hertzian Line Contact", *Optomechanics 2011: Innovations and Solutions*, 2011, 5 pages.

Capetta, I. S. et al., "Fatigue Damage Evaluation on Mechanical Components Under Multiaxial Loadings", European Comsol Conference, University of Ferrara, Oct. 16, 2009, 25 pages.

Carstens, J. P. et al., "Rock Cutting by Laser", a paper of *Society of Petroleum Engineers of AIME*, 1971, 11 pages.

Caruso, C. et al., "Dynamic Crack Propagation in Fiber Reinforced Composites", Excerpt from the Proceedings of the COMSOL Conference, 2009, 5 pages.

Chastain, T. et al., "Deepwater Drilling Riser System", *SPE Drilling Engineering*, Aug 1986, pp. 325-328.

Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.

Chen, K., paper titled "Analysis of Oil Film Interferometry Implementation in Non-Ideal Conditions", source unknown, Jan. 7, 2010, pp. 1-18.

Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.

Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.

Cimetiere, A. et al., "A Damage Model for Concrete Beams in Compression", *Mechanics Research Communications*, vol. 34, 2007, pp. 91-96.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Cohen, J. H., "High-Power Slim-Hole Drilling System", a paper presented at the conference entitled Natural Gas RD&D Contractors Review Meeting, Office of Scientific and Technical Information, Apr. 1995, 10 pages.

Cone, C., "Case History of the University Block 9 (Wolfcamp) Field—Gas-Water Injection Secondary Recovery Project", *Journal of Petroleum Technology*, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

Coray, P. S. et al., "Measurements on 5:1 Scale Abrasive Water Jet Cutting Head Models", source unknown, available prior to 2012, 15 pages.

Cruden, D. M., "The Static Fatigue of Brittle Rock Under Uniaxial Compression", *Int. J. Rock Mech. Min. Sci. & Geomech. Abstr.*, vol. 11, 1974, pp. 67-73.

da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.

Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.

de Castro Lima, J. J. et al., "Linear Thermal Expansion of Granitic Rocks: Influence of Apparent Porosity, Grain Size and Quartz Content", *Bull Eng Geol Env.*, vol. 63, 2004, pp. 215-220.

Degallaix, J. et al., "Simulation of Bulk-Absorption Thermal Lensing in Transmissive Optics of Gravitational Waves Detector", *Appl. Phys.*, B77, 2003, pp. 409-414.

Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.

Dole, L. et al., "Cost-Effective Cementitious Material Compatible with Yucca Mountain Repository Geochemistry", a paper prepared by Oak Ridge National Laboratory for the US Department of Energy, No. ORNL/TM-2004/296, Dec. 2004, 128 pages.

Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.

Dutton, S. P. et al., "Evolution of Porosity and Permeability in the Lower Cretaceous Travis Peak Formation, East Texas", *The American Association of Petroleum Geologists Bulletin*, vol. 76, No. 2, Feb. 1992, pp. 252-269.

Dyskin, A. V. et al., "Asymptotic Analysis of Crack Interaction with Free Boundary", *International Journal of Solids and Structure*, vol. 37, 2000, pp. 857-886.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Ersoy, A., "Wear Characteristics of PDC Pin and Hybrid Core Bits in Rock Drilling", *Wear*, vol. 188, 1995, pp. 150-165.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

(56) References Cited

OTHER PUBLICATIONS

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Field, F. A., "A Simple Crack-Extension Criterion for Time-Dependent Spallation", *J. Mech. Phys. Solids*, vol. 19, 1971, pp. 61-70.

Finger, J. T. et al., "PDC Bit Research at Sandia National Laboratories", Sandia Report No. SAND89-0079-UC-253, a report prepared for US Department of Energy, Jun. 1989, 88 pages.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Excavation Engineering Associates, Inc. for the US Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gahan, B. C. et al., "Laser Drilling: Drilling with the Power of Light, Phase 1: Feasibility Study", a Topical Report by the *Gas Technology Institute*, for the US Government under Cooperative Agreement No. DE-FC26-00NT40917, Sep. 30, 2001, 107 pages.

Gale, J. F. W. et al., "Natural Fractures in the Barnett Shale and Their Importance for Hydraulic Fracture Treatments", the American Association of Petroleum Geologists, *AAPG Bulletin*, vol. 91, No. 4, Apr. 2007, pp. 603-622.

Gardner, R. D. et al., "Fluorescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998, pp. 761-770.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "Inhomogeneous Boundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hammer, D. X. et al., "Shielding Properties of Laser-Induced Breakdown in Water for Pulse Durations from 5 ns. To 125 fs", *Applied Optics*, vol. 36, No. 22, Aug. 1, 1997, pp. 5630-5640.

Hancock, M. J., "The 1-D Heat Equation: 18.303 Linear Partial Differential Equations", source unknown, 2004, pp. 1-41.

Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.

Hareland, G. et al., "Drag—Bit Model Including Wear", *SPE*, No. 26957, a paper prepared for presentation at the Latin American/Caribbean Petroleum Engineering Conference, Apr. 1994, pp. 657-667.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Nesting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

Hood, M., "Waterjet-Assisted Rock Cutting Systems—The Present State of the Art", *International Journal of Mining Engineering*, vol. 3, 1985, pp. 91-111.

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Howells, G., "Super-Water [R] Jetting Applications from 1974 to 1999", paper presented st the Proceedings of the 10th American Waterjet Confeence in Houston, Texas, 1999, 25 pages.

Hu, H. et al., "Simultaneous Velocity and Concentration Measurements of a Turbulent Jet Mixing Flow", *Ann. N.Y. Acad. Sci.*, vol. 972, 2002, pp. 254-259.

Huang, C. et al., "A Dynamic Damage Growth Model for Uniaxial Compressive Response of Rock Aggregates", *Mechanics of Materials*, vol. 34, 2002, pp. 267-277.

Huang, H. et al., "Intrinsic Length Scales in Tool-Rock Interaction", *International Journal of Geomechanics*, Jan./Feb. 2008, pp. 39-44.

Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28 2004, 4 pages.

Hutchinson, J. W., "Mixed Mode Cracking in Layered Materials", *Advances in Applied Mechanics*, vol. 29, 1992, pp. 63-191.

Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.

Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.

Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.

(56) References Cited

OTHER PUBLICATIONS

Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.

Jurewicz, B. R., "Rock Excavation with Laser Assistance", *Int. J. Rock Mech. Min. Sci. & Geomech. Abstr.*, vol. 13, 1976, pp. 207-219.

Karakas, M., "Semianalytical Productivity Models for Perforated Completions", *SPE*, No. 18247, a paper for SPE (Society of Petroleum Engineers) Production Engineering, Feb. 1991, pp. 73-82.

Karasawa, H. et al., "Development of PDC Bits for Downhole Motors", *Proceedings 17th NZ Geothermal Workshop*, 1995, pp. 145-150.

Kemeny, J. M., "A Model for Non-linear Rock Deformation Under Compression Due to Sub- critical Crack Growth", *Int. J. Rock Mech. Min. Sci. & Geomech. Abstr.*, vol. 28 No. 6, 1991, pp. 459-467.

Khandelwal, M., "Prediction of Thermal Conductivity of Rocks by Soft Computing", *Int. J. Earth Sci. (Geol. Rundsch)*, May 11, 2010, 7 pages.

Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.

Kiwata, T. et al., "Flow Visualization and Characteristics of a Coaxial Jet with a Tabbed Annular Nozzle", *JSME International Journal Series B*, vol. 49, No. 4, 2006, pp. 906-913.

Kobayashi, T. et al., "Drilling a 2-inch in Diameter Hole in Granites Submerged in Water by CO2 Lasers", *SPE*, No. 119914, a paper prepared for presentation at the SPE/IADC Drilling Conference and Exhibition, Mar. 2009, 6 pages.

Kobyakov, A. et al., "Design Concept for Optical Fibers with Enhanced Sbs Threshold", *Optics Express*, vol. 13, No. 14, Jul. 2005, pp. 5338-5346.

Kolari, K., "Damage Mechanics Model for Brittle Failure of Transversely Isotropic Solids (Finite Element Implementation)", *VTT Publications 628*, 2007, 210 pages.

Kollé, J. J., "A Comparison of Water Jet, Abrasive Jet and Rotary Diamond Drilling in Hard Rock", *Tempress Technologies Inc.*, 1999, pp. 1-8.

Kolle, J. J., "HydroPulse Drilling", a Final Report for US Department of Energy under Cooperative Development Agreement No. DE-FC26-FT34367, Apr. 2004, 28 pages.

Kovalev, V. I. et al., "Observation of Hole Burning in Spectrum in SBS in Optical Fibres Under CW Monochromatic Laser Excitation", *IEEE*, Jun. 3, 2010, pp. 56-57.

Koyamada, Y. et al., "Simulating and Designing Brillouin Gain Spectrum in Single-Mode Fibers", *Journal of Lightwave Technology*, vol. 22, No. 2, Feb. 2004, pp. 631-639.

Krajcinovic, D. et al., "A Micromechanical Damage Model for Concrete", *Engineering Fracture Mechanics*, vol. 25, No. 5/6, 1986, pp. 585-596.

Kranz, R. L., "Microcracks in Rocks: A Review", *Tectonophysics*, vol. 100, 1983, pp. 449-480.

International Search Report for PCT Application No. PCT/US2011/044548, dated Jan. 24, 2012, 17 pgs.

International Search Report for PCT Application No. PCT/US2011/047902, dated Jan. 17, 2012, 9 pgs.

International Search Report for PCT Application No. PCT/US2011/050044, dated Feb. 1, 2012, 26 pgs.

International Search Report for PCT Application No. PCT/US2012/026277, dated May 30, 2012, 11 pgs.

International Search Report for PCT Application No. PCT/US2012/026265, dated May 30, 2012, 14 pgs.

U.S. Appl. No. 13/486,795, filed Jun. 1, 2012, Rinzler et al.

International Search Report for PCT Application No. PCT/US2012/026280, dated May 30, 2012, 12 pgs.

International Search Report for PCT Application No. PCT/US2012/026471, dated May 30, 2012, 13 pgs.

International Search Report for PCT Application No. PCT/US2012/026525, dated May 31, 2012, 8 pgs.

International Search Report for PCT Application No. PCT/US2012/026526, dated May 31, 2012, 10 pgs.

International Search Report for PCT Application No. PCT/US2012/026494, dated May 31, 2012, 12 pgs.

International Search Report for PCT Application No. PCT/US2012/026337, dated Jun. 7, 2012, 21 pgs.

International Search Report for PCT Application No. PCT/US2012/020789, dated Jun. 29, 2012, 9 pgs.

International Search Report for PCT Application No. PCT/US2012/040490, dated Oct. 22, 2012, 14 pgs.

Labuz, J. F. et al., "Experiments with Rock: Remarks on Strength and Stability Issues", *International Journal of Rock Mechanics & Mining Science*, vol. 44, 2007, pp. 525-537.

Labuz, J. F. et al., "Size Effects in Fracture of Rock", *Rock Mechanics for Industry*, Amadei, Kranz, Scott & Smeallie (eds), 1999, pp. 1137-1143.

Langeveld, C. J., "PDC Bit Dynamics", a paper prepared for presentation at the 1992 IACD/SPE Drilling Conference, Feb 1992, pp. 227-241.

Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.

Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.

Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.

Li, Q. et al., "Experimental Research on Crack Propagation and Failure in Rock-type Materials under Compression", *EJGE*, vol. 13, Bund. D, 2008, p. 1-13.

Li, X. B. et al., "Experimental Investigation in the Breakage of Hard Rock by the PDC Cutters with Combined Action Modes", *Tunnelling and Underground Space Technology*, vol. 16, 2001, pp. 107-114.

Liddle, D. et al., "Cross Sector Decommissioning Workshop", presentation, Mar. 23, 2011, 14 pages.

Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.

Loland, K. E., "Continuous Damage Model for Load-Response Estimation of Concrete", *Cement and Concrete Research*, vol. 10, 1980, pp. 395-402.

Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.

Lubarda, V. A. et al., "Damage Model for Brittle Elastic Solids with Unequal Tensile and Compressive Strengths", *Engineering Fracture Mechanics*, vol. 29, No. 5, 1994, pp. 681-692.

Lucia, F. J. et al., "Characterization of Diagenetically Altered Carbonate Reservoirs, South Cowden Grayburg Reservoir, West Texas", a paper prepared for presentation at the 1996 Spe Annual Technical Conference and Exhibition, Oct. 1996, pp. 883-893.

Luffel, D. L. et al., "Travis Peak Core Permeability and Porosity Relationships at Reservoir Stress", *SPE Formation Evaluation*, Sep 1991, pp. 310-318.

Luft, H. B. et al., "Development and Operation of a New Insulated Concentric Coiled Tubing String for Continuous Steam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.

Lund, M. et al., "Specific Ion Binding to Macromolecules: Effect of Hydrophobicity and Ion Pairing", *Langmuir*, 2008 vol. 24, 2008, pp. 3387-3391.

Manrique, E. J. et al., "EOR Field Experiences in Carbonate Reservoirs in the United States", *SPE Reservoir Evaluation & Engineering*, Dec. 2007, pp. 667-686.

Maqsood, A. et al., "Thermophysical Properties of Porous Sandstones: Measurement and Comparative Study of Some Representa-

(56) References Cited

OTHER PUBLICATIONS tive Thermal Conductivity Models", *International Journal of Thermophysics*, vol. 26, No. 5, Sep. 2005, pp. 1617-1632.
Marcuse, D., "Curvature Loss Formula for Optical Fibers", *J. Opt. Soc. Am.*, vol. 66, No. 3, 1976, pp. 216-220.
Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.
Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.
McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.
Meister, S. et al., "Glass Fibers for Stimulated Brillouin Scattering and Phase Conjugation", *Laser and Particle Beams*, vol. 25, 2007, pp. 15-21.
Mensa-Wilmot, G. et al., "New Pdc Bit Technology, Improved Drillability Analysis, and Operational Practices Improve Drilling Performance in Hard and Highly Heterogeneous Applications", a paper prepared for the 2004 SPE (Society of Petroleum Engineers) Eastern Regional Meeting, Sep. 2004, pp. 1-14.
Messica, A. et al., "Theory of Fiber-Optic Evanescent-Wave Spectroscopy and Sensor", *Applied Optics*, vol. 35, No. 13, 1 May 1996, pp. 2274-2284.
Mills, W. R. et al., "Pulsed Neutron Porosity Logging", SPWLA Twenty-Ninth Annual Logging Symposium, Jun. 1988, pp. 1-21.
Mirkovich, V. V., "Experimental Study Relating Thermal Conductivity to Thermal Piercing of Rocks", *Int. J. Rock Mech. Min. Sci.*, vol. 5, 1968, pp. 205-218.
Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.
Moavenzadeh, F. et al., "Thin Disk Technique for Analyzing Fock Fractures Induced by Laser Irradiation", a report prepared for the US Department of Transportation under Contract C-85-65, May 1968, 91 pages.
Montross, C. S. et al., "Laser-Induced Shock Wave Generation and Shock Wave Enhancement in Basalt", *International Journal of Rock Mechanics and Mining Sciences*, 1999, pp. 849-855.
Morozumi, Y. et al., "Growth and Structures of Surface Disturbances of a Round Liquid Jet in a Coaxial Airflow", *Fluid Dynamics Research*, vol. 34, 2004, pp. 217-231.
Moshier, S. O., "Microporosity in Micritic Limestones: A Review", *Sedimentary Geology*, vol. 63, 1989, pp. 191-213.
Mostafa, M. S. et al., "Investigation of Thermal Properties of Some Basalt Samples in Egypt", *Journal of Thermal Analysis and Calorimetry*, vol. 75, 2004, pp. 178-188.
Mukhin, I. B. et al., "Experimental Study of Kilowatt-Average-Power Faraday Isolators", *OSA/ASSP*, 2007, 3 pages.
Multari, R. A. et al., "Effect of Sampling Geometry on Elemental Emissions in Laser-Induced Breakdown Spectroscopy", *Applied Spectroscopy*, vol. 50, No. 12, 1996, pp. 1483-1499.
Munro, R. G., "Effective Medium Theory of the Porosity Dependence of Bulk Moduli", *Communications of American Ceramic Society*, vol. 84, No. 5, 2001, pp. 1190-1192.
Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.
Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.
Myung, I. J., "Tutorial on Maximum Likelihood Estimation", *Journal of Mathematical Psychology*, vol. 47, 2003, pp. 90-100.

Nakano, A. et al., "Visualization for Heat and Mass Transport Phenomena in Supercritical Artificial Air", *Cryogenics*, vol. 45, 2005, pp. 557-565.
Nara, Y. et al., "Study of Subcritical Crack Growth in Andesite Using the Double Torsion Test", *International Journal of Rock Mechanics & Mining Sciences*, vol. 42, 2005, pp. 521-530.
Nicklaus, K. et al., "Optical Isolator for Unpolarized Laser Radiation at Multi-Kilowatt Average Power", *Optical Society of America*, 2005, 3 pages.
Nikles, M. et al., "Brillouin Gain Spectrum Characterization in Single-Mode Optical Fibers", *Journal of Lightwave Technology*, vol. 15, No. 10, Oct. 1997, pp. 1842-1851.
Nilsen, B. et al., "Recent Developments in Site Investigation and Testing for Hard Rock TBM Projects", *1999 RETC Proceedings*, 1999, pp. 715-731.
Nimick, F. B., "Empirical Relationships Between Porosity and the Mechanical Properties of Tuff", *Key Questions in Rock Mechanics*, Cundall et al. (eds), 1988, pp. 741-742.
Nolen-Hoeksema, R., "Fracture Development and Mechnical Stratigraphy of Austin Chalk, Texas: Discussion", a discussion for The American Association of Petroleum Geologists Bulletin, vol. 73, No. 6, Jun. 1989, pp. 792-793.
Oglesby, K. et al., "Advanced Ultra High Speed Motor for Drilling", a project update by Impact Technologies LLC for the US Department of Energy, Sep. 12, 2005, 36 pages.
Ouyang, L. B. et al., "General Single Phase Wellbore Flow Model", a report prepared for the US COE/PETC, May 2, 1997, 51 pages.
Palchaev, D. K. et al., "Thermal Expansion of Silicon Carbide Materials", *Journal of Engineering Physics and Thermophysics*, vol. 66, No. 6, 1994, 3 pages.
Patricio, M. et al., "Crack Propagation Analysis", while the date of the publication is unknown, it is believed to be prior to Aug. 19, 2009, 24 pages.
Peebler, R. P. et al., "Formation Evaluation with Logs in the Deep Anadarko Basin", *SPE of AIME*, 1972, 15 pages.
Pepper, D. W. et al., "Benchmarking COMSOL Multiphysics 3.5a—CFD Problems", a presentation, Oct. 10, 2009, 54 pages.
Pettitt, R. et al., "Evolution of a Hybrid Roller Cone/PDC Core Bit", a paper prepared for Geothermal Resources Council 1980 Annual Meeting, Sep. 1980, 7 pages.
Phani, K. K. et al., "Porosity Dependence of Ultrasonic Velocity and Elastic Modulus in Sintered Uranium Dioxide—a discussion", *Journal of Materials Science Letters*, vol. 5, 1986, pp. 427-430.
Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.
Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.
Pooniwala, S. et al., "Lasers: The Next Bit", a paper prepared for the presentation at the 2006 SPE (Society of Petroleum Engineers) Eastern Regional Meeting, Oct. 2006, pp. 1-10.
Porter, J. A. et al., "Cutting Thin Sheet Metal with a Water Jet Guided Laser Using Various Cutting Distances, Feed Speeds and Angles of Incidence", *Int. J. Adv. Manuf. Technol.*, vol. 33, 2007, pp. 961-967.
Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.
Potyondy, D. O., "Simulating Stress Corrosion with a Bonded-Particle Model for Rock", *International Journal of Rock Mechanics & Mining Sciences*, vol. 44, 2007, pp. 677-691.
Price, R. H. et al., "Analysis of the Elastic and Strength Properties of Yuccs Mountain tuff, Nevada", 26th US Symposium on Rock Mechanics, Jun. 1985, pp. 89-96.
Quinn, R. D. et al., "A Method for Calculating Transient Surface Temperatures and Surface Heating Rates for High-Speed Aircraft", NASA, Dec. 2000, 35 pages.
Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.

(56) References Cited

OTHER PUBLICATIONS

Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.

Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Rauenzahn, R. M. et al., "Rock Failure Mechanisms of Flame-Jet Thermal Spallation Drilling-Theory and Experimental Testing", *Int. J. Rock Mech. Min. Sci. & Geomech. Abstr.*, vol. 26, No. 5, 1989, pp. 381-399.

Ravishankar, M. K., "Some Results on Search Complexity vs Accuracy", DARPA Spoken Systems Technology Workshop, Feb. 1997, 4 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of Igneous Rocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

Rijken, P. et al., "Predicting Fracture Attributes in the Travis Peak Formation Using Quantitative Mechanical Modeling and Structural Diagenesis", Gulf Coast Association of Geoloical Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", *Tectonophysics*, vol. 337, 2001, pp. 117-133.

Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rubin, A. M. et al., "Dynamic Tensile-Failure-Induced Velocity Deficits in Rock", *Geophysical Research Letters*, vol. 18, No. 2, Feb. 1991, pp. 219-222.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Santarelli, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for the US Department of Energy, Apr. 1989, 69 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Shiraki, K. et al., "SBS Threshold of a Fiber with a Brillouin Frequency Shift Distribution", *Journal of Lightwave Technology*, vol. 14, No. 1, Jan. 1996, pp. 50-57.

Singh, T. N. et al., "Prediction of Thermal Conductivity of Rock Through Physico-Mechanical Properties", *Building and Environment*, vol. 42, 2007, pp. 146-155.

Sinha, D., "Cantilever Drilling—Ushering a New Genre of Drilling", a paper prepared for presentation at the SPE/IADC Middle East Drilling Technology Conference and Exhibition, Oct. 2003, 6 pages.

Sinor, A. et al., "Drag Bit Wear Model", *SPE Drilling Engineering*, Jun. 1989, pp. 128-136.

Smith, D., "Using Coupling Variables to Solve Compressible Flow, Multiphase Flow and Plasma Processing Problems", COMSOL Users Conference 2006, Nov. 1, 2006, 38 pages.

Sneider, RM et al., "Rock Types, Depositional History, and Diangenetic Effects, Ivishak reservoir Prudhoe Bay Field", *SPE Reservoir Engineering*, Feb. 1997, pp. 23-30.

Soeder, D. J. et al., "Pore Geometry in High- and Low-Permeability Sandstones, Travis Peak Formation, East Texas", *SPE Formation Evaluation*, Dec. 1990, pp. 421-430.

Somerton, W. H. et al., "Thermal Expansion of Fluid Saturated Rocks Under Stress", SPWLA Twenty-Second Annual Logging Symposium, Jun. 1981, pp. 1-8.

Sousa, L. M. O. et al., "Influence of Microfractures and Porosity on the Physico-Mechanical Properties and Weathering of Ornamental Granites", *Engineering Geology*, vol. 77, 2005, pp. 153-168.

Stowell, J. F. W., "Characterization of Opening-Mode Fracture Systems in the Austin Chalk", *Gulf Coast Association of Geological Societies Transactions*, vol. L1, 2001, pp. 313-320.

Straka, W. A. et al., "Cavitation Inception in Quiescent and Co-Flow Nozzle Jets", 9th International Conference on Hydrodynamics, Oct. 2010, pp. 813-819.

Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.

Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.

Tao, Q. et al., "A Chemo-Poro-Thermoelastic Model for Stress/Pore Pressure Analysis around a Wellbore in Shale", a paper prepared for presentation at the US Symposium on Rock Mechanics (USRMS): *Rock Mechanics for Energy*, Mineral and Infrastructure Development in the Northern Regions, Jun. 2005, 7 pages.

Terzopoulos, D. et al., "Modeling Inelastic Deformation: Viscoelasticity, Plasticity, Fracture", *SIGGRAPH '88*, Aug. 1988, pp. 269-278.

Thomas, R. P., "Heat Flow Mapping at the Geysers Geothermal Field", published by the California Department of Conservation Division of Oil and Gas, 1986, 56 pages.

Thompson, G. D., "Effects of Formation Compressive Strength on Perforator Performance", a paper presented of the Southern District API Division of Production, Mar. 1962, pp. 191-197.

Tovo, R. et al., "Fatigue Damage Evaluation on Mechanical Components Under Multiaxial Loadings", excerpt from the Proceedings of the COMSOL Conference, 2009, 8 pages.

Tuler, F. R. et al., "A Criterion for the Time Dependence of Dynamic Fracture", *The International Journal of Fracture Mechanics*, vol. 4, No. 4, Dec. 1968, pp. 431-437.

Turner, D. et al., "New DC Motor for Downhole Drilling and Pumping Applications", a paper prepared for presentation at the SPE/ICoTA Coiled Tubing Roundtable, Mar. 2001, pp. 1-7.

Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.

Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.

Valsangkar, A. J. et al., Stress-Strain Relationship for Empirical Equations of Creep in Rocks, *Engineering Geology*, Mar. 29, 1971, 5 pages.

Wagh, A. S. et al., "Dependence of Ceramic Fracture Properties on Porosity", *Journal of Material Sience*, vol. 28, 1993, pp. 3589-3593.

(56) References Cited

OTHER PUBLICATIONS

Waldron, K. et al., "The Microstructures of Perthitic Alkali Feldspars Revealed by Hydroflouric Acid Etching", *Contributions to Mineralogy and Petrology*, vol. 116, 1994, pp. 360-364.

Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.

Wandera, C. et al., "Characterization of the Melt Removal Rate in Laser Cutting of Thick-Section Stainless Steel", *Journal of Laser Applications*, vol. 22, No. 2, May 2010, pp. 62-70.

Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainless Steel Plate", a paper for publication in the Proceeding IMechE Part B, *Journal of Engineering Manufacture*, vol. 225, 2011, 22 pages.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Wang, G. et al., "Particle Modeling Simulation of Thermal Effects on Ore Breakage", *Computational Materials Science*, vol. 43, 2008, pp. 892-901.

Waples, D. W. et al., "A Review and Evaluation of Specific Heat Capacities of Rocks, Minerals, and Subsurface Fluids. Part 1: Minerals and Nonporous Rocks", *Natural Resources Research*, vol. 13, No. 2, Jun 2004, pp. 97-122.

Waples, D. W. et al., "A Review and Evaluation of Specific Heat Capacities of Rocks, Minerals, and Subsurface Fluids. Part 2: Fluids and Porous Rocks", *Natural Resources Research*, vol. 13 No. 2, Jun. 2004, pp. 123-130.

Warren, T. M. et al., "Laboratory Drilling Performance of PDC Bits", *SPE Drilling Engineering*, Jun. 1988, pp. 125-135.

White, E. J. et al., "Reservoir Rock Characteristics of the Madison Limestone in the Williston Basin", *The Log Analyst*, Sep.-Oct. 1970, pp. 17-25.

White, E. J. et al., "Rock Matrix Properties of the Ratcliffe Interval (Madison Limestone) Flat Lake Field, Montana", *SPE of AIME*, Jun. 1968, 16 pages.

Wilkinson, M. A. et al., "Experimental Measurement of Surface Temperatures During Flame-Jet Induced Thermal Spallation", *Rock Mechanics and Rock Engineering*, 1993, pp. 29-62.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of the Industrial Physicist at: http://www.aip.org/tip/INPHFA/vol-9/iss-3/p24.html, on May 18, 2010, pp. 1-5.

Wu, X. Y. et al., "The Effects of Thermal Softening and Heat Conductin on the Dynamic Growth of Voids", *International Journal of Solids and Structures*, vol. 40, 2003, pp. 4461-4478.

Xiao, J. Q. et al., "Inverted S-Shaped Model for Nonlinear Fatigue Damage of Rock", *International Journal of Rock Mechanics & Mining Sciences*, vol. 46, 2009, pp. 643-648.

Xu, Z. et al., "Application of High Powered Lasers to Perforated Completions", *International Congress on Applications of Laser & Electro-Optics*, Oct. 2003, 6 pages.

Xu, Z. et al., "Laser Spallation of Rocks for Oil Well Drilling", Proceedings of the 23rd International Congress on Applications of Lasers and Electro-Optics, 2004, pp. 1-6.

Xu, Z. et al., "Modeling of Laser Spallation Drilling of Rocks for Gas-and Oilwell Drilling", a paper prepared for the presentation at the 2005 SPE (Society of Petroleum Engineers) Annual Technical Conference and Exhibition, Oct. 2005, 6 pages.

Xu, Z. et al., "Rock Perforation by Pulsed Nd:YAG Laser", Proceedings of the 23rd International Congress on Applications of Lasers and Electro-Optics 2004, 2004, 5 pages.

Xu, Z. et al., "Specific Energy for Pulsed Laser Rock Drilling", *Journal of Laser Applications*, vol. 15, No. 1, Feb. 2003, pp. 25-30.

Yabe, T. et al., "The Constrained Interpolation Profile Method for Multiphase Analysis", *Journal of Computational Physics*, vol. 169, 2001, pp. 556-593.

Yamamoto, K. Y. et al., "Detection of Metals in the Environment Using a Portable Laser-Induced Breakdown Spectroscopy Instrument", *Applied Spectroscopy*, vol. 50, No. 2, 1996, pp. 222-233.

Yamashita, Y. et al., "Underwater Laser Welding by 4kW CW YAG Laser", *Journal of Nuclear Science and Technology*, vol. 38, No. 10, Oct. 2001, pp. 891-895.

Yasar, E. et al., "Determination of the Thermal Conductivity from Physico-Mechanical Properties", *Bull Eng. Geol. Environ.*, vol. 67, 2008, pp. 219-225.

York, J. L. et al., "The Influence of Flashing and Cavitation on Spray Formation", a progress report for UMRI Project 2815 with Delavan Manufacturing Company, Oct. 1959, 27 pages.

Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.

Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): *Rock Mechanics Across Borders and Disciplines*, Jun. 2004, 9 pages.

Zehnder, A. T., "Lecture Notes on Fracture Mechanics", 2007, 227 pages.

Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.

Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.

Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.

Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.

Zhu, X. et al., "High-Power ZBLAN Glass Fiber Lasers: Review and Prospect", *Advances in OptoElectronics*, vol. 2010, pp. 1-23.

Zietz, J. et al., "Determinants of House Prices: A Quantile Regression Approach", *Department of Economics and Finance Working Paper Series*, May 2007, 27 pages.

Zuckerman, N. et al., "Jet Impingement Heat Transfer: Physics, Correlations, and Numerical Modeling", *Advances in Heat Transfer*, vol. 39, 2006, pp. 565-631.

Author known, "Heat Capacity Analysis", published by Bechtel SAIC Company LLC, a report prepared for US Department of Energy, Nov. 2004, 100 pages.

Author unknown, "Cross Process Innovations", Obtained from the Internet at: http://www.mrl.columbia.edu/ntm/CrossProcess/CrossProcessSect5.htm, on Feb. 2, 2010, 11 pages.

Author unknown, "Introduction to Optical Liquids", Cargille-Sacher Laboratories Inc., Obtained from the Internet at: http://www.cargille.com/opticalintro.shtml, on Dec. 23, 2008, 5 pages.

Author unknown, "Laser Drilling", Oil & Natural Gas Projects (Exploration & Production Technologies) Technical Paper, Dept. of Energy, Jul. 2007, 3 pages.

Author unknown, "Leaders in Industry Luncheon", IPAA & TIPRO, Jul. 2009, 19 pages.

(56) References Cited

OTHER PUBLICATIONS

Author unknown, "Nonhomogeneous PDE—Heat Equation with a Forcing Term", a lecture, 2010, 6 pages.
Author unknown, "Performance Indicators for Geothermal Power Plants", prepared by International Geothermal Association for World Energy Council Working Group on Performance of Renewable Energy Plants, author unknown, Mar. 2011, 7 pages.
Author unknown, "Shock Tube Solved With Cosmol Multiphysics 3.5a", published by Comsol Multiphysics, 2008, 5 pages.
Author unknown, "Stimulated Brillouin Scattering (SBS) in Optical Fibers", published by Centro de Pesquisa em Optica e Fotonica, Obtained from the Internet at: http://cepof.ifi.unicamp.br/index.php . . . ), on Jun. 25, 2012, 2 pages.
Author unknown, "Underwater Laser Cutting", published by TWI Ltd, May/Jun. 2011, 2 pages.
Related utility application assigned U.S. Appl. No. 13/486,795, filed Jun. 1, 2012, 166 pages.
Related utility application assigned U.S. Appl. No. 13/565,345, filed Aug. 2, 2012, 112 pages.
U.S. Appl. No. 13/565,345, filed Aug. 2, 2012, Zediker et al.
U.S. Appl. No. 13/768,149, filed Jan. 15, 2013, Zediker et al.
U.S. Appl. No. 13/777,650, filed Feb. 26, 2013, Zediker et al.
U.S. Appl. No. 13/782,869, filed Mar. 1, 2013, Schroit et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2012, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
U.S. Appl. No. 13/852,719, filed Mar. 28, 2013, Faircloth et al.
U.S. Appl. No. 13/768,149, filed Feb. 15, 2013, 27 pages.
U.S. Appl. No. 13/777,650, filed Feb. 26, 2013, 73 pages.
U.S. Appl. No. 13/782,869, filed Mar. 1, 2013, 80 pages.
U.S. Appl. No. 13/782,942, filed Mar. 1, 2013, 81 pages.
U.S. Appl. No. 13/800,559, filed Mar. 13, 2013, 73 pages.
U.S. Appl. No. 13/800,820, filed Mar. 13, 2013, 73 pages.
U.S. Appl. No. 13/800,879, filed Mar. 13, 2013, 73 pages.
U.S. Appl. No. 13/800,933, filed Mar. 13, 2013, 73 pages.
U.S. Appl. No. 13/849,831, filed Mar. 25, 2013, 83 pages.
U.S. Appl. No. 13/852,719, filed Mar. 28, 2013, 85 pages.

\* cited by examiner

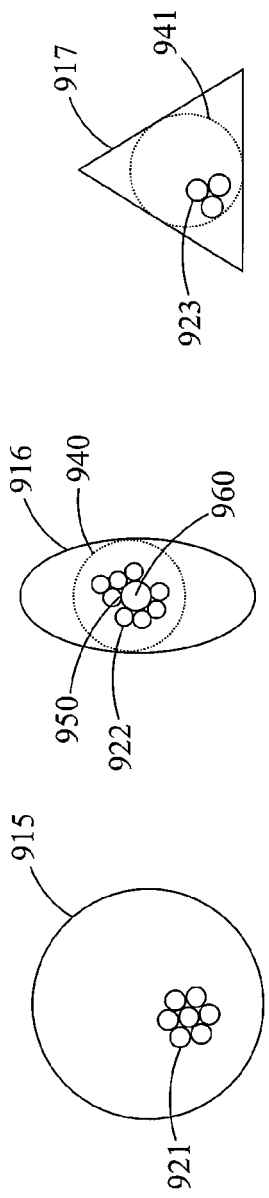
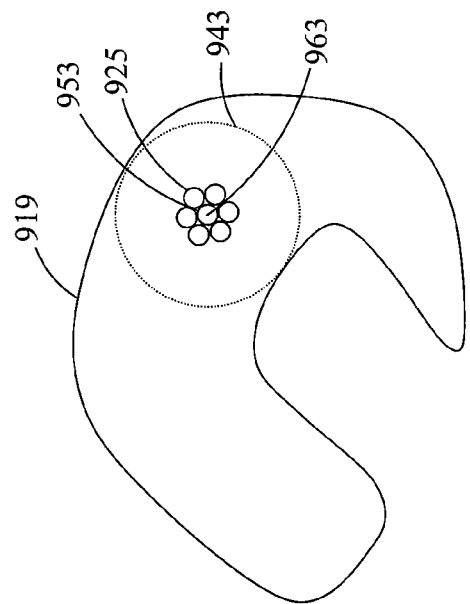
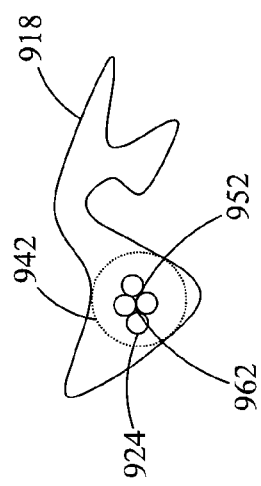
Fig. 9A  Fig. 9B  Fig. 9C
Fig. 10A  Fig. 10B

OPTICAL FIBER CONFIGURATIONS FOR TRANSMISSION OF LASER ENERGY OVER GREAT DISTANCES

This invention was made with Government support under Award DE-AR0000044 awarded by the Office of ARPA-E U.S. Department of Energy. The Government has certain rights in this invention.

BACKGROUND OF THE INVENTION

1. Field of the Invention

The present invention relates to configurations of optical fibers that provide the ability to assemble, spool and unspool, deploy or use such configurations, while maintaining the fiber's ability to transmit laser energy over distances, and in particular, over great distance and at high powers. The present invention further relates to configurations that are strengthened to withstand harsh environments, such as the environments found in a borehole, a nuclear plant, or under the sea. In particular, the present invention relates to unique and novel configurations utilizing additional fiber length to minimize bending losses while providing benefits for selected predetermined applications.

As used herein, unless specified otherwise "high power laser energy" means a laser beam having at least about 5 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

2. Discussion of Related Art

Until the development of the inventions set forth in patent application Ser. No. 12/706,576, pending, filed Feb. 16, 2010, the entire disclosure of which is incorporated herein by reference, it was believed that the transmission of high power laser energy over great distances without substantial loss of power was unobtainable. As a consequence, prior to the inventions of that patent application it was further believed that there was no reason to construct, or investigate the composition of, an optical fiber, an optical fiber configuration, or an optical fiber cable for the transmission of high power laser energy over great distances.

Power loss over long distances occurs in an optical fiber from many sources including: absorption loss, and in particular absorption loss from hydroxyl ions (OH$^-$); Rayleigh scattering; Brillouin scattering; Raman scattering; defects; inclusions; and bending loss. These problems have been documented in the literature.

An example of the prior belief in the art that a paradigm existed between the transmission of high power laser energy over great distances and substantial power loss, is illustrated in the article by Muto et al., titled "Laser cutting for thick concrete by multi-pass technique," CHINESE OPTICS LETTERS Vol. 5, Supplement May 31, 2007, pages S39-S41 (hereinafter referred to as "Muto"). Although Muto states that 4 kW of power were delivered down a 1 km fiber, when 5 kW of laser power was put into the fiber, Muto fails to eliminate the stimulated Raman scattering ("SRS") phenomena. As shown by Muto's paper this deleterious phenomenon will effectively clamp the output power as length or power is increased. The SRS phenomenon is shown by the spectrum in FIG. 3 of Muto. Thus, prior to the invention of Ser. No. 12/706,576, it was believed that as input laser power, or the length of the fiber increased, the power output of a fiber would not increase because of the stimulated Brillouin scattering ("SBS"), SRS and other nonlinear phenomena. In particular, SBS would transfer the output power back up the fiber toward the input. Further, SBS, SRS, as well as the other deleterious nonlinear effects, in addition to limiting the amount of power that can be transmitted out of the fiber, can result in fiber heating and ultimate failure. Thus, as recognized by Muto, at page S41 "[i]t is found that 10-kW-power delivery is feasible through a 250-m-long fiber with the core diameter of 150 µm. The physical phenomenon which restricts the transmitted power is SRS." Thus, Muto, as did others before him, failed to deliver high power laser energy over great distances.

Further, Muto does not disclose, discuss or address the placing of its optical fiber in any protective tubing or material, the coiling and uncoiling of its fiber or the strengthening of its fiber for use in a particular application. In particular, Muto does not address the bending losses associated with such configurations and, in particular, the bending losses that are associated with strengthened configurations.

The present invention provides solutions to bending loss problems that are associated with configuring optical fibers in protective structures and, in particular, in placing long lengths of high power optical fibers in protective tubing and then coiling and uncoiling such a configuration. Various solutions, examples of which are provided in this specification, are provided for minimizing, and in certain instances eliminating to any practical extent, bending losses that result from such configurations.

The present invention advances the art of laser delivery, and in particular the art of high power laser delivery, by providing an optical fiber configuration that avoids or mitigates the bending losses associated with optical fiber configurations and, in particular, provides an optical fiber configuration for the transmission of high power laser energy over great distances in harsh environments without substantial power loss.

SUMMARY

It is desirable to have an optical fiber configuration that provides for the delivery of laser energy and in particular high power laser energy over great distances and without substantial power loss, in particular losses from bending. The present invention, among other things, solves these needs by providing the articles of manufacture, devices and processes taught herein.

Thus, there is provided an optical fiber configuration for transmitting laser energy over great distances for use in an application, the optical fiber configuration having an optical fiber, that has a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$). The configuration also has an outer protective member around the optical fiber, which has a first end, a second end, and a length ($L_{OPM}$) defined between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$. In this configuration, the first and second ends of the outer protective member and the first and second ends of the optical fiber are substantially coterminous; the optical fiber configuration has a predetermined temperature range ($\Delta T$), a predetermined mechanical strain ($\epsilon$), and a predetermined inner radius of coil ($R_{coil}$); and the $L_F$ is greater than the $L_{OPM}$, so that $L_F - L_{OPM} = $ AFL (additional fiber length). In this configuration the optical fiber takes a helical non-following path within the outer protective member; and, the AFL is equal to or between at least one of: an AFL[L] from Formulas 2 and 4; or an AFL[%] from Formulas 1 and 3, which formulas are set forth herein.

There is further provided an optical fiber configuration for transmitting laser energy over great distances, having an optical fiber, which has a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$). This configuration further has an outer protective member around the optical fiber, the outer protective member has a first end, a second end, and a length ($L_{OPM}$) between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$. The configuration is further characterized in that the first and second ends of the outer protective member and the first and second ends of the optical fiber are substantially coterminous; wherein the optical fiber configuration has a predetermined temperature range ($\Delta T$), a predetermined mechanical strain ($\epsilon$), and a predetermined inner radius of coil ($R_{coil}$); and wherein the $L_F$ is greater than the $L_{OPM}$, so that $L_F - L_{OPM} = AFL$ (additional fiber length). In this configuration the optical fiber takes on a sinusoidal non-following path within the outer protective member; and, the AFL is equal to or between at least one of: an AFL[L] from Formulas 9 and 11; or an AFL[%] from Formulas 8 and 10, set forth herein.

There is additionally provided an optical fiber configuration for transmitting laser energy over great distances for use in an application, having an optical fiber, a portion of which has a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$). This configuration further has an outer protective member around the optical fiber portion, a portion of the outer protective member comprising a first end, a second end, and a length ($L_{OPM}$) defined between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$. The configuration is characterized by the first and second ends of the outer protective member and the first and second ends of the optical fiber are substantially coterminous or being coterminous, which would be include as substantially coterminous. This configuration has has a predetermined temperature range ($\Delta T$), a predetermined mechanical strain ($\epsilon$), and a predetermined inner radius of coil ($R_{coil}$); wherein the $L_F$ is greater than the $L_{OPM}$, so that $L_F - L_{OPM} = AFL$ (additional fiber length). It further has the optical fiber taking a helical non-following path within the outer protective member; and, the AFL is equal to or between at least one of: an AFL[L] from Formulas 2 and 4; or an AFL[%] from Formulas 1 and 3 set forth herein. This optical fiber configuration is capable of transmitting at least about 1 kW, about 2 kW, and about 10 kW of laser energy over great distances without substantial bending losses.

There is also provided an optical fiber configuration for transmitting laser energy over great distances for use in an application, having an optical fiber, a portion of the fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$). The configuration further having an outer protective member around the optical fiber portion, a portion of the outer protective member comprising a first end, a second end, and a length ($L_{OPM}$) between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$. In this configuration the first and second ends of the outer protective member and the first and second ends of the optical fiber are substantially coterminous; wherein the optical fiber configuration has a predetermined temperature range ($\Delta T$), a predetermined mechanical strain ($\epsilon$), and a predetermined inner radius of coil ($R_{coil}$); and wherein the $L_F$ is greater than the $L_{OPM}$, so that $L_F - L_{OPM} = AFL$ (additional fiber length). In this configuration the optical fiber takes a sinusoidal non-following path within the outer protective member; and the AFL is equal to or between at least one of: an AFL[L] from Formulas 9 and 11; or an AFL[%] from Formulas 8 and 10 set forth herein. This optical fiber configuration is capable of transmitting at least about 1 kW, of about 2 kW or about 10 kW of laser energy over great distances without substantial bending losses.

Additionally, there is provided an optical fiber configuration for reducing bending losses for use in an application, which has an optical fiber that has a fiber core, the fiber core having a diameter of at least about 100 μm, an outer protective member in association with the optical fiber, and a means for simultaneously providing a benefit of additional fiber length while minimizing the bending losses associated with additional fiber length. In this configuration there may further be a plurality of optical fibers and wherein the outer protective member has a substantially convex outer geometry, or a plurality of optical fibers and wherein the outer protective member has a substantially concave outer geometry. These configurations may still further be capable of transmitting laser energy greater than about 5 kW, over distances greater than about 1 km without substantial power loss and may yet still further be capable of transmitting laser energy greater than about 10 kW, over distances greater than about 1 km without substantial power loss.

In these configurations provided herein the additional fiber length benefits may be, among others, separate or combined: accommodating the coiling and uncoiling of the configuration; accommodating a difference in tensile strength between the optical fiber and the outer protective member; accommodating a difference in deformation between the optical fiber and the outer protective member; accommodating a difference in deformation between the optical fiber and the outer protective member brought about by thermal factors; holding or affixing the optical fiber within the outer protective member; providing an attachment point, or section, for attaching tools, fibers, couplers, or connectors to the optical fiber; and, reducing rattling of the optical fiber within the outer protective member.

There is also provided methods for making the optical fiber configurations provided herein, which methods include selecting a value for an inner radius of the outer protective member, $R_{OPM}$; selecting a value for an outer radius of the fiber, $R_F$; selecting a value for a temperature change that the configuration is capable of withstanding, $\Delta T$; selecting a value for a mechanical strain that the configuration is capable of withstanding, $\epsilon$; selecting a value for the coefficient of thermal expansion of the fiber, $CTE_F$; selecting a value for a coefficient of thermal expansion of the outer protective member, $CTE_{OPM}$; selecting a value for a length of outer protective member at ambient temperature and no mechanical strain, $L_{OPM}$; selecting a value for a minimum bend radius of the fiber, $R_{Fmin}$; selecting a value for an inner radius of a coil of the configuration, $R_{coil}$; selecting that the fiber will have a non-following path that may be helical, sinusoidal or combinations thereof, within the outer protective member; and, using these determined values to select a maximum AFL[L] and a minimum AFL[L] using the formulas provided herein and making the optical fiber configuration in accordance with the determined maximum and minimum AFL[L]s, such that the total fiber length is between the maximum and minimum determined AFL[L]s.

Still further there is provided an optical fiber configuration for transmitting laser energy over great distances for use in an application, the optical fiber configuration comprising: an optical fiber, the optical fiber comprising a first end, a second end, and a length (LF) defined between the first and second optical fiber ends that is greater than approximately 500 m, an outer protective member around the optical fiber, the outer protective member comprising a first end, a second end, and a length (LOPM) defined between the first and second outer protective member ends; wherein the LF is greater than the LOPM ; and the optical fiber and outer protective member configured so that when high power laser energy is directed from the first optical fiber end to the second fiber end there is not substantial loss of power of the high power laser energy at the second optical fiber end when compared with initial power of the high power laser energy entering the first optical fiber end. This optical fiber configuration may further have configurations in which the first and second ends of the outer protective member and the first and second ends of the optical fiber are substantially coterminous; wherein the optical fiber takes a helical non-following path within the outer protective member; wherein the optical fiber takes a helical non-following path within the outer protective member; wherein the optical fiber takes a sinusoidal non-following path within the outer protective member; and, wherein the optical fiber takes a sinusoidal non-following path within the outer protective member.

BRIEF DESCRIPTION OF THE DRAWINGS

FIGS. 9A to C are illustrations of end view cross sections of exemplary optical fiber configurations having multiple fibers and substantially convex outer geometries.

FIGS. 10A to B are illustrations of end view cross sections of exemplary optical fiber configurations having multiple fibers and substantially concave outer geometries.

DESCRIPTION OF THE PREFERRED EMBODIMENTS

Figure 1:
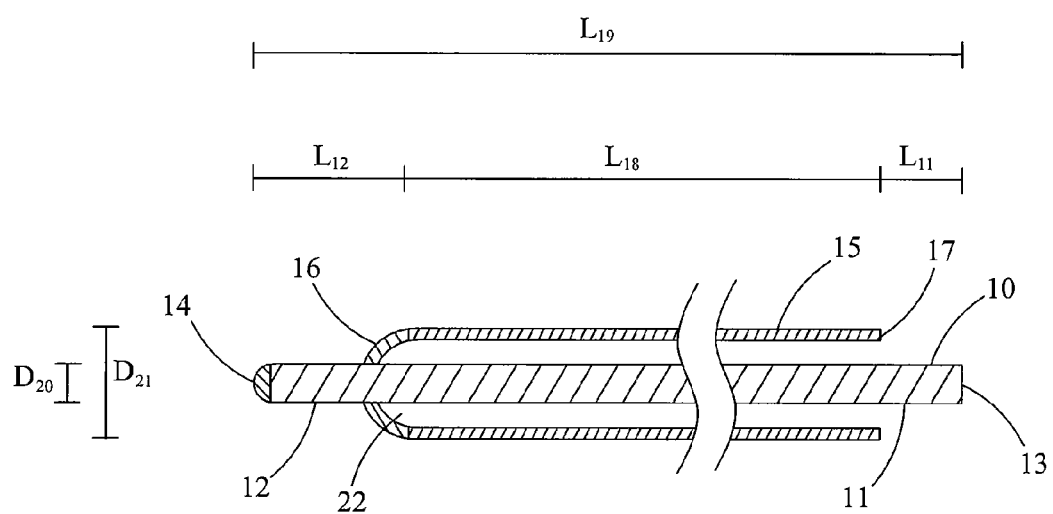
FIG. 1 is an illustration of a longitudinal and end view cross section of a relaxed fiber in a protective member.

In general, the present inventions relate to optical fiber configurations for transmitting laser energy over long distances without substantial loss of power. These inventions further relate to such configurations for transmitting high power laser energy over great distances, and in particular for doing so in harsh environments, while minimizing bending losses that may be brought on by means taken to protect the fibers in such harsh environments.

Thus, in general, and by way of illustrative examples, there are provided in FIGS. 1 to 4 illustrations of optical fiber configurations. In these figures like numbers have like meaning. Thus, there is provided an optical fiber 10 and an outer protective member 15, e.g., a tube.

The optical fiber 10 has a fiber core and may preferably have a fiber cladding, and a coating, and may also have a protective layer or layers. The fiber cladding surrounds the fiber core, and the coating, if present, surrounds the cladding. The fiber core is preferably circular in cross section. The outer protective member 15 may be made from any suitable material necessary to meet the requirements of a particular use, based upon various requirements, such as for example temperature, pressure, length, weight and the presence of solvents, other materials, or conditions that could degrade, damage or effect the fiber's ability to transmit laser energy. The space 22 between the outer surface of the fiber and the inner surface of the protective member, may further be filled with, or otherwise contain, a gel, an elastomer or some other material, such as a fluid. The material, if any, selected for use in the space 22 may be selected, among other reasons, to reduce movement or rattling of the fiber in the protective member, to aid in the assembly of the optical fiber configuration, to protect the fiber from mechanical damage, to protect the fiber from thermal damage, to restrain the fiber in a particular configuration, to support the fiber when hanging vertically within the protective member, or other purposes.

The fiber core may preferably be composed of fused silica, which preferably has a water content of at most about 0.25 ppm. The fiber core may be composed of other materials, such as those disclosed in U.S. Patent Application Publication No. 2010/0044106, the entire disclosure of which is incorporated herein by reference. Higher purity materials, and the highest purity material available, for use in the fiber core are preferred. This higher purity material minimizes the scattering losses and absorption losses caused by defects and inclusions. The fiber core is about 200 to about 1000 μm (microns) in diameter or greater, preferably from about 500 to about 700 μm in diameter and more preferably about 600 μm in diameter. As used herein the term "about" would include ranges of plus or minus 10%.

The fiber cladding may preferably be composed of fluorine doped fused silica. The fiber cladding may be composed of other materials such as fused silica doped with index-altering ions, e.g., germanium, as well as those disclosed in U.S. Patent Application Publication No. 2010/0044106. The fiber cladding thickness, depending upon the wavelength of the laser being used and the fiber core diameter, is from about 50 μm to about 250 μm, but could also be substantially thicker, preferably about 40 µm to about 70 µm and more preferably about 60 µm. As used herein with respect to a multi-layer structure, the term "thickness" means the distance between the layer's inner diameter and its outer diameter. The thickness of the fiber cladding is dependent upon and relative to the fiber core size and the intended wavelength. In general for 1.1 µm wavelength the outer diameter of the fiber cladding should be 1.1× the outer diameter of core or greater; and, for a 1.5 µm wavelength the outer diameter of the fiber cladding should be 1.5× the outer diameter of the fiber core or greater. Single, as well as, multiple fiber cladding may be utilized. Further, the fiber may have no fiber cladding.

The coating is preferably composed of a high temperature acrylate polymer, for higher temperatures a polyimide coating is desirable. The coating may be composed of other materials, such a metal, as well as those disclosed in U.S. Patent Application Publication No. 2010/0044106. The coating thickness is preferably from about 50 µm to about 250 µm, more preferably about 40 µm to about 150 µm and more preferably about 90 µm. The coating thickness may even be thicker for extreme environments, conditions and special uses or it may be thinner for environments and uses that are less demanding. Further, a hard clad, buffer and other coatings may be used as well. The coating can be tailored to protect against specific environmental or physical risks to the fiber core and fiber cladding that may be encountered or anticipated in a specific use for the cable.

The protective layer, if present, may be a single layer or multiple layers, thus it may be a first protective layer and a second protective layer, which layers may be the same or different material, or the protective layer may be a single composite layer having different materials. If present, the protective layer surrounds the fiber core (if no fiber cladding and no coating are present), the fiber cladding (if no coating is present), or the coating.

The protective layer may be a thixotropic gel. In one of the preferred embodiments, this layer primarily protects the fiber from absorption loss from hydroxyl ions as a result of hydrogen migration and protects the fiber from vibration. The thixotropic gel protects the fiber from mechanical damage due to vibrations, as well as, provides support for the fiber when hanging vertically because its viscosity increases when it is static. A palladium additive may be added to the thixotropic gel to provide hydrogen scavenging. The hydrogen that diffuses into the fiber may be problematic for germanium or similar ion doped fiber cores. When using a pure silica doped fiber core, it is less of an effect. The protective layer(s) may be composed of other materials, such as those disclosed in U.S. Patent Application Publication No. 2010/0044106. The thickness of the protective layer(s) should be selected based upon the environment and conditions of use, as well as, the desired flexibility or stiffness of the cable. Thus, the composition and thickness of the protective layer(s) can be tailored to protect against specific environmental or physical risks to the fiber core, fiber cladding and coating that may be encountered or anticipated in a specific application for the cable. Further, the use of the thixotropic gel provides the dual benefit of adding in the manufacture of the cable, as well as, providing mechanical protection to the fiber core once the cable manufacturing is completed.

Figure 8A:
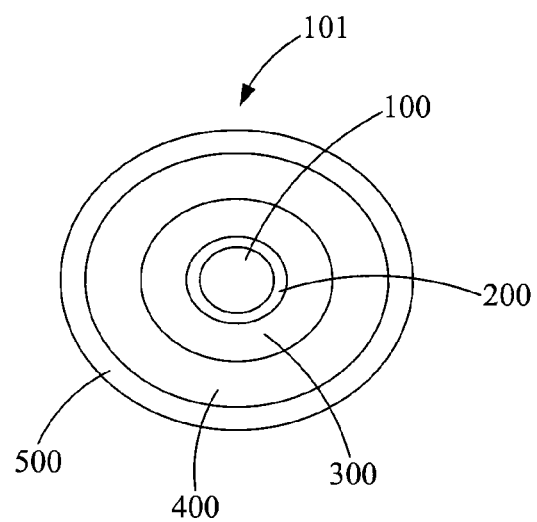
FIG. 8A is an illustration of an end view cross section of a fiber.
Figure 8B:
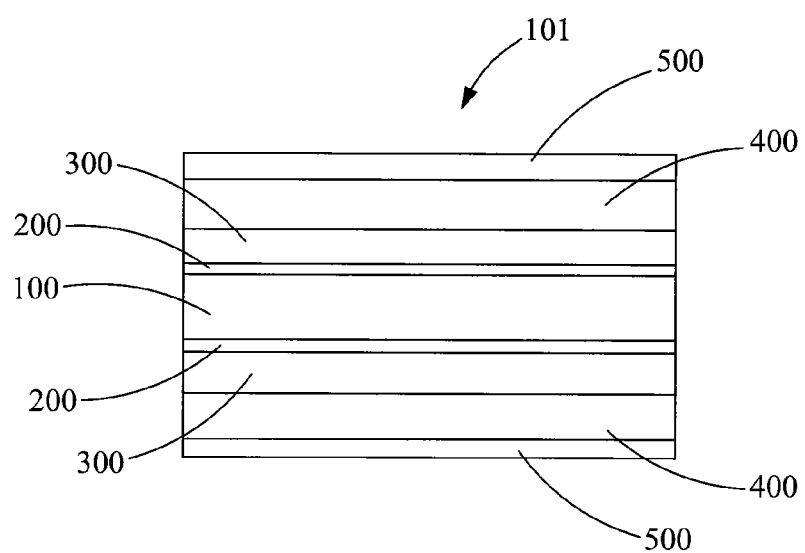
FIG. 8B is an illustration of a longitudinal cross section of the fiber of FIG. 8A.

A general illustration of an example of a fiber, having a coating and protective layers, is shown in FIGS. 8A and 8B. Thus, there is provided a fiber 101, having a fiber core 100, a fiber cladding 200, a coating 300, a first protective layer 400 and a second protective layer 500. The fiber 101 and the fiber core 100 are preferably cylindrical in shape, while the fiber cladding 200, coating 300 and protective layers 400 and 500 are preferably annular in shape.

The outer protective member may preferably be a stainless steel tube composed of 316 stainless steel. If a coating, or a coating and a protective layer, are used with the fiber, the outer protective member would surround those structures. Further, if multiple protective layers are used the outer protective member could constitute one of those layers.

The outer protective member, for example the outer protective member 15 shown in FIGS. 1 to 4, may provide physical strength to the fiber over great distances, as well as, protection from physical damage and the environment in which the fiber may be used. In addition to metal, the outer protective member may be composed of composite structures, such as, for example, carbon fiber composite tubes. The outer protective member may be composed of other materials, such as those disclosed in U.S. Patent Application Publication No. 2010/0044106. The outer protective member thickness should be selected based upon the requirements for use and the environment in which the configuration may be used. The thickness may further depend upon the weight and strength of the material from which it is made. Thus, the thickness and composition of the outer protective member can be tailored to protect against specific environmental or physical risks to the fiber core, fiber cladding and coating that may be encountered or anticipated in a specific use for the configuration.

Further the outer protective member may be any shape, composition or structure that is suitable or desirable for a particular intended application or use. Thus, for example the outer protective member may be circular, elliptical, rectangular, square or combinations of these shapes, such as, a rectangle having rounded corners, as is seen for example in the tubing manufactured by Canadian Company CJS and sold under the trademark FLATpak™. For example, in FIGS. 9A to C there is shown outer protective members 915, 916 and 917 having substantially convex outer geometries. Thus, protective member 915 has a circular outer geometry, protective member 916 has an elliptical outer geometry and protective member 917 has a triangular outer geometry. In FIGS. 10A and B there is further shown extreme examples, for illustrative purposes, of outer protective members 918 and 919 having substantially concave outer geometries. Further, the outer protective member does not necessarily have to be composed of a single tube or member. Thus, for example the outer protective member may be a composite of materials, such as wound wires or cables, with or without a binding media, as may be seen in the outer structure of wireline used in the oil and drilling industries. Moreover, the outer protective member need not be solid, thus a mesh, wire, or coiled structure could be employed. Further, the fiber may be packaged in a Teflon® sleeve or equivalent as another means of providing a protective member.

Turning to the configurations illustrated in FIGS. 1 to 4 the outer protective member 15 has a total length $L_{18}$ and the optical fiber 10 has a total length $L_{19}$. The outer protective member has a width, which in the case of a circular tube, is its diameter, and has an inner width or diameter $D_{21}$. The optical fiber has an outer width or outer diameter $D_{20}$. The outer protective member 15 has a first end 16 and a second end 17. The optical fiber has a first end 14 and a second end 13. In a relaxed state shown in FIG. 1, i.e., for practical purposes no forces restraining or affixing the fiber to the protective member, the fiber ends 14, 13 extend beyond the outer protective member ends 16, 17, and thus, fiber section 12 and fiber section 11 extend beyond ends 16, 17 of the outer protective member 15 by lengths $L_{12}$ and $L_{11}$. This additional length of fiber ($L_{12}$, $L_{11}$), which in this example of a relaxed state extends beyond the ends of the outer protective member, is the additional fiber length ("AFL") that is present in the configuration, i.e., the difference in total length between the length $L_{18}$ of the outer protective member and the total length $L_{19}$ of the fiber (i.e., AFL=$L_{11}$+$L_{12}$=$L_{19}$−$L_{18}$).

Figure 2:
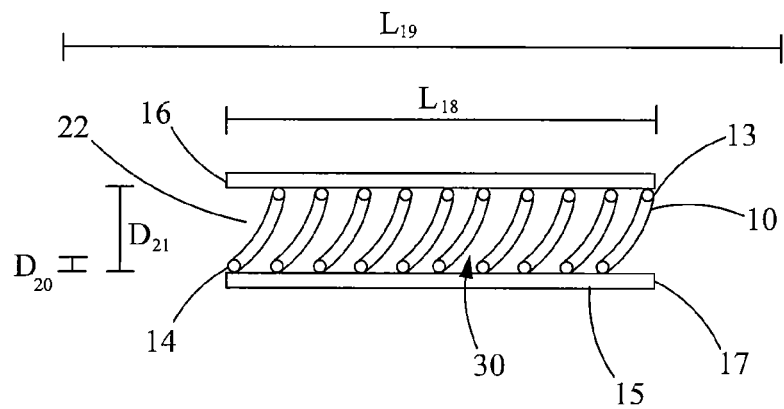
FIG. 2 is an illustration of a longitudinal view cross section of an optical fiber configuration having a non-following helical fiber path.
Figure 3:
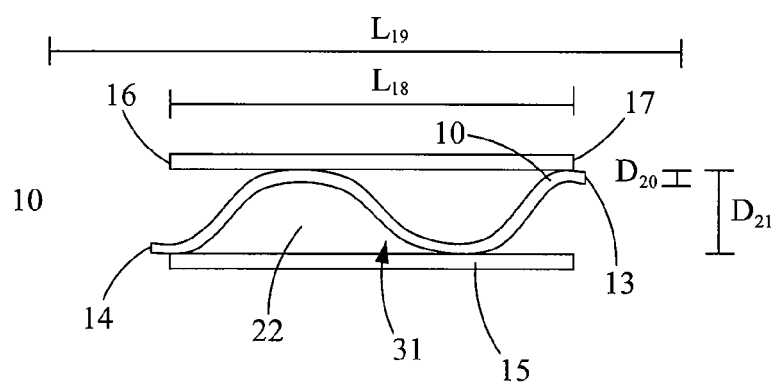
FIG. 3 is an illustration of a longitudinal view cross section of an optical fiber configuration having a non-following sinusoidal fiber path.
Figure 4:
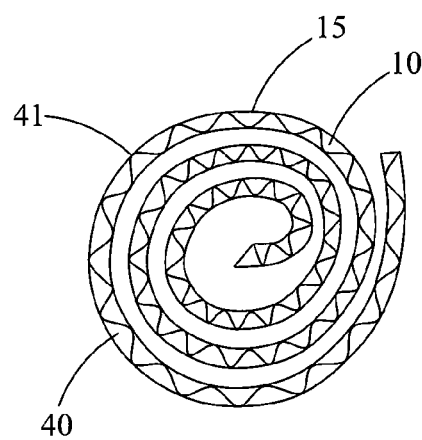
FIG. 4 is an illustration of a longitudinal view cross section of a coil of an optical fiber configuration having a non-following path.

In the optical fiber configurations of the present inventions, as shown by way of example in FIGS. 2 to 4, the additional fiber length, when the fiber and protective member ends are coterminous, or substantially coterminous, is taken up and contained within the outer protective member 15 by the fiber 10 having a non-linear, or non-following, path within the outer protective member 15. The terms "non-liner fiber path" and "non-following fiber path," as used herein, are synonymous and mean that the fiber has additional or different curves, bends or sections than the outer protective member. Examples of configurations where the fiber takes a non-following path with respect to the outer protective member 15 are shown in FIGS. 2, 3 and 4.

In FIG. 2 there is provided a fiber 10 in which the AFL is taken up by a helical positioning 30 of the fiber within the outer protective member 15. In this figure there is illustrated the fiber ends 14, 13 being coterminous with the outer protective member ends 16, 17 respectively. The AFL is this figure would be illustrated by the difference between the total fiber length $L_{19}$ and the total outer protective member length $L_{18}$. There is further shown the inner diameter $D_{21}$ of the outer protective member 15 and the outer diameter $D_{20}$ of the fiber 10.

In FIG. 3 there is provided a fiber 10 in which the AFL is taken up by a sinusoidal positioning 31 of the fiber within the outer protective member 15. In this figure there is illustrated the fiber ends 14, 13 being substantially coterminous with the outer protective member ends 16, 17 respectively. The AFL is this figure would be illustrated by the difference between the total fiber length $L_{19}$ and the total outer protective member length $L_{18}$. Substantially coterminous would include small sections of fiber that extend, temporarily or permanently, from one or both ends of the outer protective member 15 that, for example, could be used to attach to a tool, connector, coupler, or other fiber. Substantially coterminous, in keeping with the spirit of the present invention, is meant to include optical fiber configurations, having fibers extending beyond the ends of the outer protective member in an unrelaxed state, but which obtain the benefits of having AFL, while reducing or eliminating bending losses that prior to the present invention would have been brought on by the presence of such AFL. There is further shown in FIG. 3 the inner diameter $D_{21}$ of the outer protective member 15 and the outer diameter $D_{20}$ of the fiber 10.

The length indicator bars, L and D, as well as other features shown in the figures are for illustrative and qualitative purposes, and are not quantitative or drawn to scale.

In FIG. 4 these is show an optical fiber configuration 41, for example, as if it were coiled around a spool. The configuration has a fiber 10 that has a non-following fiber path 40, through the outer protective member 15.

There are several benefits and needs for having additional fiber length in an optical fiber configuration. For example, the additional fiber length can accommodate differences in the thermal rates of expansion between the fiber and the outer protective member. Further, by way of example, the additional fiber length can accommodate the differences in length between the fiber and the outer protective member when the configuration is coiled, e.g., spooled, and uncoiled, e.g., deployed. Moreover, by way of example, the additional fiber length can accommodate the differences in tensile strength and deformation between the fiber and the outer protective member when the configuration is placed under load, i.e., mechanical strain. Additionally, by way of example, the additional fiber length can, to a greater or lesser extent, fix or hold the fiber in place within the outer protective member, and thus, prevent or restrict the fiber from rattling or vibrating within the outer protective member. The additional fiber length may also be partly pulled out of the protective member for attaching tools, fibers, etc., to the end of the fiber, and then, pushed back into the member for protection. As the present inventions becomes known to those of skill in the art, additional benefits and uses may be discovered, and such new uses for the present invention form a part of the scope of protection sough herein. These, as well as other, benefits and needs for additional fiber length, in particular for high power long distance optical fiber configurations, can, as illustrated herein, be determined, selected and specified for a particular application, use, environment or deployment.

However, the presence of additional fiber length in an optical fiber configuration, when the ends of the fiber and outer protective member are coterminous or substantially conterminous, may have deleterious effects on the ability to transmit laser energy. Similarly, the presence of a non-following fiber path, whether or not resultant from the presence of additional fiber length, in the optical fiber configuration, may have deleterious effects on the ability to transmit laser energy. In particular as laser power increases and the length of the configuration increases the deleterious effects of the necessary additional fiber length may range from severe, i.e., substantial power loss, to total power loss, i.e., no laser power is transmitted through the fiber. These deleterious effects are caused by bending losses that occur when the fiber takes a non-following path within the outer protective member or when the fiber is coiled too tightly.

The present inventions address and provide solutions to the problems of bending losses in optical fiber configurations caused by additional fiber length, and in particular provide solutions to the problems of bending losses in fibers having laser power greater than 1 kW, fibers having high laser power, i.e., 5 kW and greater, and in optical fiber configurations of great lengths, i.e., greater than 500 m, while at the same time providing the benefits of and meeting the needs for additional fiber length. Thus, the additional fiber length for a given fiber in a given outer protective member should be long enough to address the needs for the additional fiber length in a particular use environment and to obtain any benefits from the presence of the additional fiber length for such use in such environment, while not being so long as to give rise to excess bending losses.

Thus, the following factors as applied to the novel aspects of the present invention provide optical fiber configurations that have the requisite additional fiber length while minimizing or preventing bending losses in that configuration from the additional fiber length taking a non-following path. Predetermined values for these factors would be selected or determined for a particular application, use, environment or deployment. These factors are defined as follows:

Inner radius of the outer protective member=$R_{OPM}$[L] where [L] is a unit of length, such as meters.

Outer radius of the optical fiber (including cladding and coating, if present)=$R_F$[L].

Temperature change, i.e., temperature range, that the configuration must sustain in the intend use=$\Delta T$ [T], where [T] is a unit of temperature, such as degrees centigrade. $\Delta T$ is the difference between the average temperature along the length of the configuration that the configuration will reach during an intended use, ($AvgTL_{in\ use}$) and the average temperature along the length of the configuration that the configuration will reach when AFL is determined, e.g., when the optical fiber is assembled into the outer protective member ($AvgTL_{when\ determined}$). Thus, $\Delta T = AvgTL_{in\ use} - AvgTL_{when\ determined}$.

Mechanical strain that the configuration must sustain in the intend use $=\epsilon$.

Coefficient of thermal expansion of the fiber=$CTE_F$[1/T].

Coefficient of thermal expansion of the outer protective member=$CTE_{OPM}$[1/T].

Length of outer protective member at ambient temperature and no mechanical strain=$L_{OPM}$[L].

Minimum bend radius of fiber=$R_{Fmin}$[L], where the minimum bend radius is that point at which the macro bending losses exceed the desired dB/km loss for a selected wavelength.

Inner radius of a coil of the configuration =$R_{coil}$[L].

The presently preferred embodiment of this invention, and the area where it is presently believed substantial benefits will be obtained, is in the area of configurations having greater lengths, and in particular, configurations having lengths of about 1 km or greater, between about 1 km and 2 km, from about 5 km to about 7 km and greater. To transport, store, use and deploy these long configurations they will need to be coiled, for example on a spool or creel. However, if the configuration were used in an application or location where coiling was not necessary, or otherwise contraindicated, the value for $R_{coil}$[L] for an uncoiled, i.e., essentially straight configuration, would be infinity.

The following ranges, teachings, relationships and examples are illustrative of the considerations that may be used in selecting or determining values for these factors. Thus, the size of the inner radius of the outer protective member, $R_{OPM}$, can be based, in part, upon the flexibility of the optical fiber and upon the outer diameter of the optical fiber. By way of example, the inner radius of the outer protective member can range from microns to 2.5 mm, to 4 mm and larger; for an optical fiber having a 50 µm outer diameter the inner radius of the outer protective member can range from about 125 µm to much larger; and, for an optical fiber having a 300 µm outer diameter the inner radius of the outer protective member can range from about 600 µm to about 2.5 mm to 4 mm and larger. The outer radius of the fiber, $R_F$, can range from about 50 µm to 4 mm or greater. The temperature change, $\Delta T$, can range from about −273° C. to about 800° C. Higher temperature ranges are possible as higher temperature coatings are developed. The mechanical strain, E, can range from about 0 to about 0.33 of the proof test strength for long term stresses, which for example is 30-40 ksi for a 20 year life time, for shorter time scale applications high stresses could be utilized. Further, compressible outer protective member may be used that could experience compressive mechanical stain and thus in this example the mechanical strain would be negative.

For a helical non-following path, such as shown in FIG. 2, the calculations of Formulas 1 to 4 set forth below can be used to determine the range of excess fiber length available without creating adverse bending losses. Formulas 1 and 2 provide a determination of the maximum AFL as a percentage of total length of the configuration and as a length.

$$AFL[\%] \leq \text{minimum of} \left[ \sqrt{\frac{1}{\frac{1}{\left(\frac{1}{R_{Fmin}} - \frac{1}{R_{coil}}\right)(R_{OPM} - R_F)} - 1} + 1} - 1 \text{ or} \right.$$

Formula 1

$$\left. \sqrt{\frac{1}{\frac{1}{\left(\frac{1}{R_{Fmin}} - \frac{1}{R_{coil}}\right)(R_{OPM} - R_F)} - 1} + 1} - 1 + (CTE_{OPM} - CTE_F)\Delta T + \varepsilon \right]$$

$$AFL[L] \leq AFL[\%] \times L_{OPM}$$

Formula 2

Formulas 3 and 4 below provide a determination of the minimum AFL as a percentage of total length of the configuration and as a length.

$$AFL[\%] \geq \max \left[ (CTE_{OPM} - CTE_F)\Delta T + \epsilon \text{ or } 0 \right]$$

Formula 3

$$AFL[L] \geq AFL[\%] \times L_{OPM}$$

Formula 4

Accordingly, examples of optical fiber configurations of the present invention are configurations of a fiber and outer protective member wherein the AFL[L] of the fiber is between about the lengths obtained from Formulas 2 and 4, or the percentages obtained from Formulas 1 and 3, based upon predetermined selected factors for that use.

For a sinusoidal non-following path, such as shown, the calculations of Formulas 5 to 11 set forth below can be used to determine the range of excess fiber length available without creating adverse bending losses.

(amplitude of sinusoid = $a$)  Formula 5

$$a = R_{OPM} - R_F$$

(maximum frequency of sinusoid)  Formula 6

$$b = \frac{1}{\sqrt{a \times \frac{1}{\frac{1}{R_{Fmin}} + \frac{1}{R_{coil}}}}}$$

(arc length of sine curve)  Formula 7

$$F = \int_0^{L_{OPM}} \sqrt{(1 + a^2 b^2 \cos^2 bx)}\, dx$$

Formulas 8 and 9 provide a determination of the maximum AFL as a percentage of total length of the configuration and as a length.

$$AFL[\%] \leq \text{minimum of } \left[\frac{F}{L_{OPM}} - \right.$$

$$\left. 1 \text{ or } \frac{F}{L_{OPM}} - 1 + (CTE_{OPM} - CTE_F)\Delta T + \varepsilon\right] \quad \text{Formula 8}$$

$$AFL[L] \leq AFL[\%] \times L_{OPM} \quad \text{Formula 9}$$

Formulas 10 and 11 provide a determination of the minimum AFL as a percentage of total length of the configuration and as a length, respectively.

$$AFL[\%] \geq \max[(CTE_{OPM} - CTE_F)\Delta T + \varepsilon \text{ or } 0] \quad \text{Formula 10}$$

$$AFL[L] \geq AFL[\%] \times L_{OPM} \quad \text{Formula 11}$$

The relationship of the minimum bend radius as a function of numeric aperture ("NA") of the fiber can be expressed using the following factors and Formula 12. NA characterizes the range of angles over which the fiber can accept or emit light in air. Thus, the NA with respect to a point depends upon the half-angle of the maximum cone of light that can that can enter or exit the fiber, i.e., NA=n*sin(half-angle), where n is the index of refract of the medium, in this case air, which is about 1 at STP (20 C, at 1 atm.).

α=(dB/km)(power loss that is selected, specified or determined for a loss application)

$$\alpha_{sys} = \frac{\alpha}{100}$$

n=index of refraction of the core.
k=2*π/λ (where λ is equal to the wavelength of the laser in meters)
$\theta_c$=arcsin (NA) (where NA is the NA in air)
$R_{Fmin}$ (where units are in meters)
α=radius of fiber core (meters)

$$\alpha_{sys} = -\ln\left[2\int_0^{\theta_c} \frac{1}{.95\sqrt{\frac{\pi\tan^2\theta_c}{2}}} e^{-\frac{2\tan^2\theta}{\tan^2\theta_c}} e^{-2nk(\theta_c^2-\theta^2)} e^{[-\frac{2}{3}nk(R_{Fmin}\theta_c^2 - R_{Fmin}\theta^2 - 2\alpha)]^{\frac{3}{2}}} d\theta\right] \quad \text{Formula 12}$$

To determine the minimum bend radius, Formula 12 may be solved for $R_{Fmin}$.

Accordingly, examples of optical fiber configurations of the present invention are configurations of a fiber and outer protective member wherein the AFL[L] of the fiber is between about the lengths obtained from Formulas 9 and 11, or the percentages obtained from Formulas 8 and 10, based upon predetermined selected factors for that use.

There are provided examples of an optical fiber configuration for use in powering a down hole laser tool or laser bottom hole assembly. In the following examples different units are provided for different facts, i.e., cm and m. It should be recognized that when applying the various formulas to the factors that the units should be consistent, e.g., all length scales in the same units such as in cm.

EXAMPLE 1

Inner radius of the outer protective member, $R_{OPM}$=1.5 mm (millimeters).
Outer radius of the fiber (including coating) $R_F[L]$=400 μm (microns).
Temperature change that the configuration must sustain in the intend use, ΔT [T]=100° C.
Mechanical strain that configuration must sustain in the intend use, ε=0.0005
Coefficient of thermal expansion of the fiber, $CTE_F$=0.55*10$^{-6}$ (1/C).
Coefficient of thermal expansion of the outer protective member, $CTE_{OPM}$=15*10$^{-6}$ (1/C).
Length of outer protective member at ambient temperature and no mechanical strain, $L_{OPM}$=2 km.
Minimum bend radius of fiber, $R_{Fmin}$=10 cm.
Inner radius of a coil (for example of the type shown in FIG. 4) of the configuration, $R_{coil}$=1.5 m.
Wherein, the AFL[L] for a helical non-following path (for example of the type shown in FIG. 2) is from about 3.89 to about 10.4 m; the AFL[%] for a helical non-following path is from about 0.195% to about 0.517%. Wherein, the AFL[L] for a sinusoidal non-following path (for example of the type shown in FIG. 3) is from about 3.89 to about 5.38 m; and, the AFL[%] for a sinusoidal non-following path is from about 0.195% to about 0.269%.

EXAMPLE 2

Inner radius of the outer protective member, $R_{OPM}$=3 mm (millimeters).
Outer radius of the fiber (including coating) $R_F[L]$=250 μm.
Temperature change that the configuration must sustain in the intend use, ΔT [T]=10° C.
Mechanical strain that configuration must sustain in the intend use, ε=0.0001.
Coefficient of thermal expansion of the fiber, $CTE_F$=0.55*10$^{-6}$ (1/C).
Coefficient of thermal expansion of the outer protective member, $CTE_{OPM}$=15*10$^{-6}$ (1/C).
Length of outer protective member at ambient temperature and no mechanical strain, $L_{OPM}$=1 km.
Minimum bend radius of fiber, $R_{Fmin}$=20 cm.
Inner radius of a coil (for example of the type shown in FIG. 4) of the configuration, $R_{coil}$=1 m.
Wherein, the AFL[L] for a helical non-following path (for example of the type shown in FIG. 2) is from about 0.245 to about 5.55 m; the AFL[%] for a helical non-following path is from about 0.0245% to about 0.555%. Wherein, the AFL[L] for a sinusoidal non-following path (for example of the type shown in FIG. 3) is from about 0.245 to about 3.45 m; and, the AFL[%] for a sinusoidal non-following path is from about 0.0245% to about 0.345%.

EXAMPLE 3

Inner radius of the outer protective member, $R_{OPM}$=1.6 mm (millimeters).
Outer radius of the fiber (including coating) $R_F[L]$=100 μm.
Temperature change that the configuration must sustain in the intend use, ΔT [T]=50° C.

Mechanical strain that configuration must sustain in the intend use, $\epsilon=0.0002$.

Coefficient of thermal expansion of the fiber, $CTE_F=0.55*10^{-6}$ (1/C).

Coefficient of thermal expansion of the outer protective member, $CTE_{OPM}=26*10^{-6}$ (1/C).

Length of outer protective member at ambient temperature and no mechanical strain, $L_{OPM}=3$ km.

Minimum bend radius of fiber, $R_{Fmin}=10$ cm.

Inner radius of a coil of the configuration, $R_{coil}=50$ cm.

Wherein, the AFL[L] for a helical non-following path (for example of the type in FIG. 2) is from about 4.42 to about 18.2 m; the AFL[%] for a helical non-following path is from about 0.147% to about 0.61%. Wherein, the AFL[L] for a sinusoidal non-following path (for example of the type shown in FIG. 3) is from about 4.42 to about 11.4 m; and, the AFL[%] for a sinusoidal non-following path is from about 0.147% to about 0.3792%.

EXAMPLE 4

Inner radius of the outer protective member, $R_{OPM}=10$ mm (millimeters).

Outer radius of the fiber (including coating) $R_F$ [L]=300 μm.

Temperature change that the configuration must sustain in the intend use, $\Delta T$ [T]=0° C.

Mechanical strain that configuration must sustain in the intend use, =0.

Coefficient of thermal expansion of the fiber, $CTE_F=0.55*10^{-6}$ (1/C).

Coefficient of thermal expansion of the outer protective member, $CTE_{OPM}=15*10^{-6}$ (1/C).

Length of outer protective member at ambient temperature and no mechanical strain, $L_{OPM}=0.5$ km.

Minimum bend radius of fiber, $R_{Fmin}=25$ cm.

Inner radius of a coil of the configuration, $R_{coil}=$Infinity. Thus, in this example the configuration would not be coiled during use, and would be kept substantially straight during use.

Wherein, the AFL[L] for a helical non-following path (for example of the type shown in FIG. 2) is from about 0 to about 10 m; the AFL[%] for a helical non-following path is from about 0% to about 2%. Wherein, the AFL[L] for a sinusoidal non-following path (for example of the type shown in FIG. 3) is from about 0 to about 4.88 m; and, the AFL[%] for a sinusoidal non-following path is from about 0% to about 0.976%.

The optical fiber configurations can be greater than about 0.5 km (kilometer), greater than about 1 km, greater than about 2 km, greater than about 3 km, greater than about 4 km and greater than about 5 km and between 1 km and 5 km and between 1 km and 20 km. As used herein the length of the configuration refers to the length when the fiber end and the outer protective end are substantially coterminous. In general the preferred fibers using the preferred optical fiber configurations can withstand temperatures of up to about 200° C. to about 300° C., pressures of up to about 3000 psi and as great as 36,000 psi, and corrosive environments over the length of the fiber without substantial loss of power and for extended periods of time. However, higher temperatures, as well as very low temperatures, greater pressures and harsher environments are contemplated and within the scope of the present inventions. The optical fiber can have a power loss, for a given wavelength, of less then about 3.0 dB/km, less than about 2.0 dB/km, less than about 1.5 dB/km, less than about 1.0 dB/km, less than about 0.5 dB/km and less than about 0.3 dB/km. The optical fiber configurations can have power transmissions of at least about 50%, at least about 60%, at least about 80%, and at least about 90%.

Any type of high power laser may be used as a source of laser energy for use with the optical fiber configurations of the present invention. Examples of such lasers are disclosed in U.S. Patent Application Publication No. 2010/0044106, the disclosure of which is incorporated herein by reference. High power infrared lasers are preferable. Wavelengths of about 1490 nm, about 1550 nm, and about 1080 nm have even greater potential benefits. Further, broadband beams within these wavelength ranges may have greater benefits. Preferably, the laser should generate a laser beam in the infrared wavelength having a power of at least about 1 kW, at least about 3 kW, at least about 5 kW, at least about 10 kW, and at least about 20 kW or greater. An example of such a preferred laser for use with the optical fiber configurations of the present invention is ytterbium fiber laser such as the IPG YLR-20000. The detailed properties of this laser are disclosed in U.S. Patent Application Publication No. 2010/0044106. The preferred laser includes 20 modules. The gain bandwidth of a fiber laser is on the order of 20 nm, the linewidth of the free oscillator is 3 nm, Full Width Half Maximum (FWHM) may range from 3 nm to 5 nm (although higher linewidths including 10 nm are envisioned and contemplated). Each module's wavelength is slightly different. The modules further each create a multi-mode beam. Thus, the cumulative effect of combining the beams from the modules is to maintain the Raman gain and the Brillouin gain at a lower value corresponding to the wavelengths and linewidths of the individual modules, and thus, consequently reducing the SBS and SRS phenomenon in the fiber when the combined beams are transmitted through the fiber.

Figure 5:
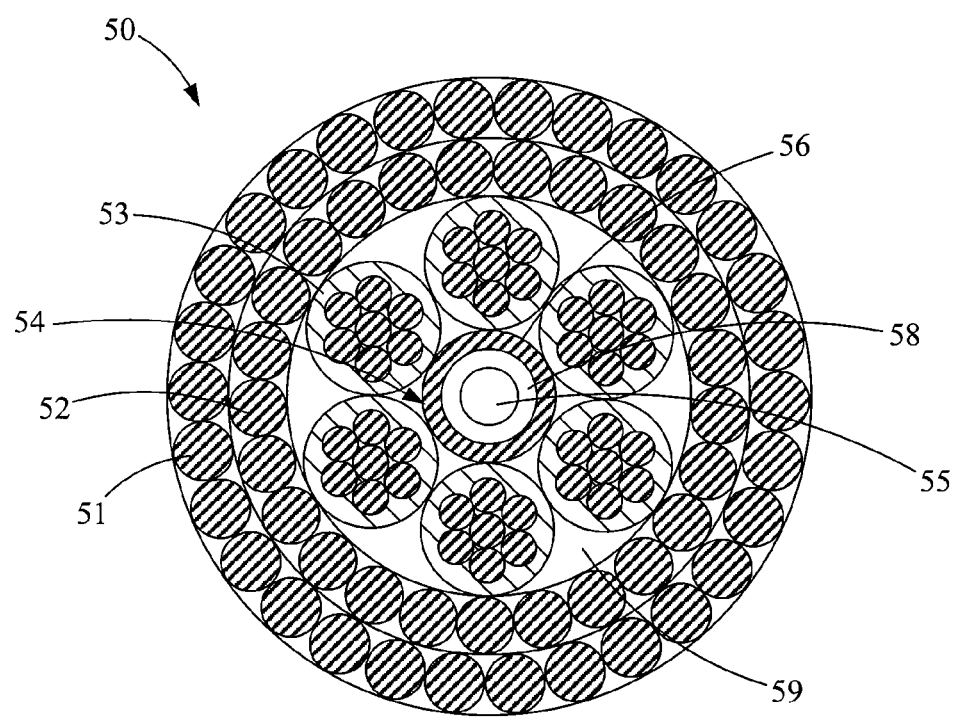
FIG. 5 is an illustration of an end view cross section of a wireline having an optical fiber configuration.

FIG. 5 illustrates a wireline 50 having two layers of helically wound armor wires, an outer layer 51 and an inner layer 52. Other types and arrangement of wirelines are know to those of skill in the art. There is further provided a plurality of insulated electrical conductors 53 and an optical fiber configuration 54, the configuration 54 having an optical fiber 55 and an outer protective member 56. The space 58 between the outer surface of the fiber and the inner surface of the protective member, may further be filled with, or otherwise contain, a gel, an elastomer or some other material, such as a fluid. Similarly, a second space 59 may further be filled with, or otherwise contain, a gel, an elastomer or some other material, such as a fluid, which material will prevent the armor wires from crushing inwardly from external pressure of an application, such as the pressure found in a well bore. Further the fiber may be packaged in a Teflon® sleeve or equivalent type of material or sleeve.

Figure 6:
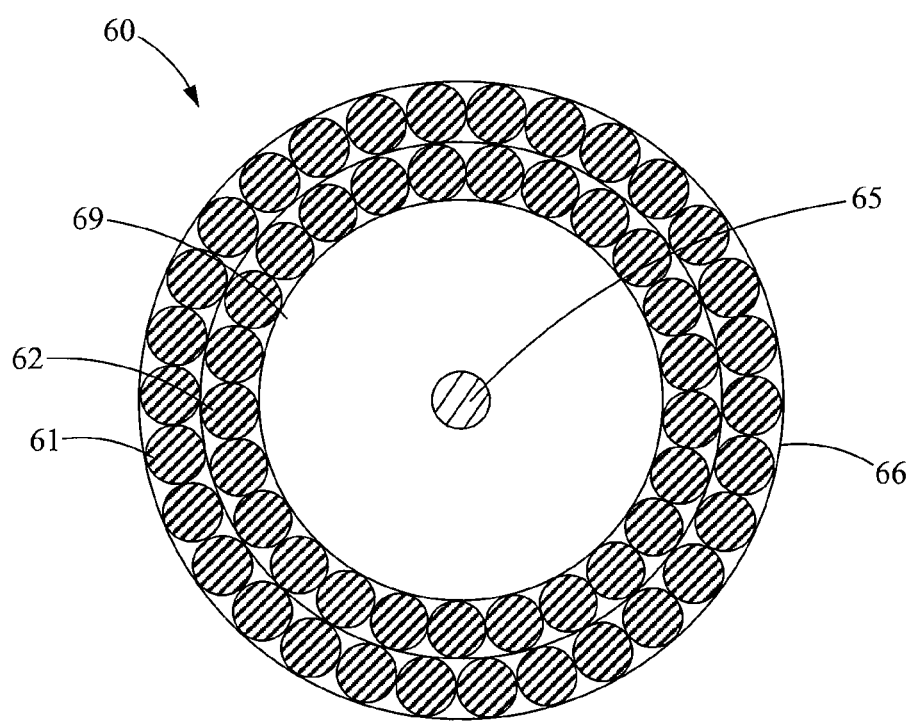
FIG. 6 is an illustration of an end view cross section of a wireline optical fiber configuration.

FIG. 6 illustrates a wireline 60 having outer armor wire layer 61 and inner armor wire layer 62. The wireline 60 constitutes an optical fiber configuration having a fiber 65 and an outer protective member 66. The space 69 between the fiber 65 and the armor wire layer 62 may further be filled with, or otherwise contain, a gel, an elastomer or some other material, such as a fluid, which material will prevent the armor wires from crushing inwardly from external pressure of an application, such as the pressure found in a well bore.

As used herein the term line structure should be given its broadest construction, unless specifically stated otherwise, and would include without limitation, wireline, coiled tubing, logging cable, cable structures used for completion, workover, drilling, seismic, sensing logging and subsea completion and other subsea activities, scale removal, wax removal, pipe cleaning, casing cleaning, cleaning of other tubulars, cables used for ROV control power and data transmission, lines structures made from steal, wire and composite materials such as carbon fiber, wire and mesh, line structures used for monitoring and evaluating pipeline and boreholes, and would include without limitation such structures as Power & Data Composite Coiled Tubing (PDT-COIL) and structures such as Smart Pipe®. The optical fiber configurations can be used in conjunction with, in association with, or as part of a line structure.

Figure 7:
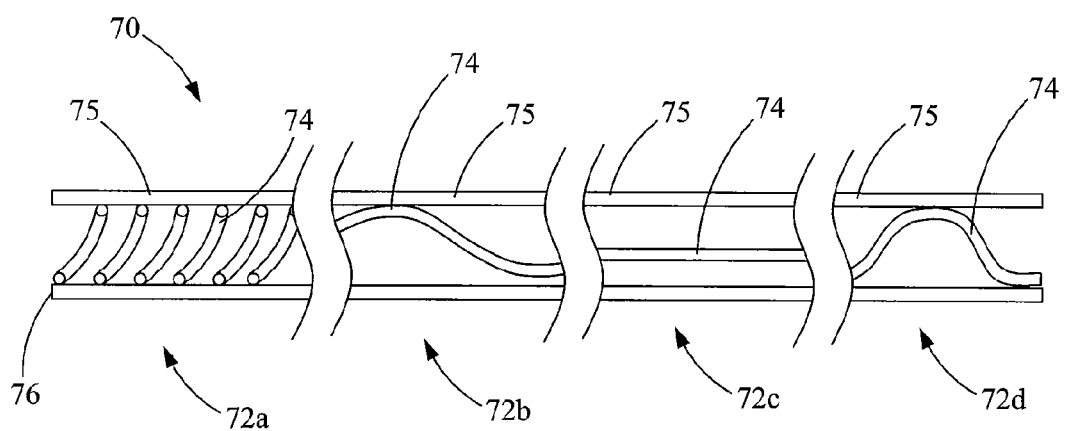
FIG. 7 is an illustration of longitudinal view cross section of an optical fiber configuration having portions having varying non-following fiber paths.

FIG. 7 illustrates an optical fiber configuration 70 having a fiber 74, an outer protective member 75 and portions 72 of the fiber each portion having a length and differing fiber paths, 72a, 72b, 72c, and 72d. Fiber paths 72a, 72b and 72d are non-following paths, while path 72c is a following path. Path 72a is a helical type of non-following path. Paths 72b and 72d are sinusoidal types of non-following paths. The optical fiber configuration 70 has ends 76, wherein it shown that the fiber is conterminous with the outer protective member. The fibers in these sections may have different or the same diameters.

EXAMPLE 5

In this example the fiber is of the type shown in FIG. 7, having a first section having a helical non-following fiber path, a second section having following fiber path, and a third section having a sinusoidal non-following fiber path. The entire configuration and its section would have the following values, factors and AFLs, which are set out in Table I.

TABLE I

| Factor | First Section | Second Section | Third Section | Total |
|---|---|---|---|---|
| Fiber Path type | helical | following | sinusoidal | n/a |
| Section length | 1.5 km | 0.1 km | 0.4 km | 2 km |
| $R_{OPM}$ | 2 mm | 2 mm | 2 mm | n/a |
| $R_F$ | 600 μm | 600 μm | 600 μm | n/a |
| ΔT | 100° C. | 100° C. | 50° C. | n/a |
| ε | 0.0005 | 0.0005 | 0.0005 | n/a |
| $CTE_F$ | $0.55 * 10^{-6}$ (1/C). | $0.55 * 10^{-6}$ (1/C). | $0.55 * 10^{-6}$ (1/C). | n/a |
| $CTE_{OPM}$ | $15 * 10^{-6}$ (1/C). | $15 * 10^{-6}$ (1/C). | $15 * 10^{-6}$ (1/C). | n/a |
| $L_{OPM}$ | 1.5 km | 0.1 km | 0.4 km | 2 km |
| $R_{Fmin}$ | 10 cm | 10 cm | 10 cm | n/a |
| $R_{coil}$ | 1 m | 1 m | 1 m | 1 m |
| AFL [L] | 2.92 to 9.54 m | .05 to .1 m | .788 to 1.41 m | 3.758 to 11.05 m |
| AFL [%] | .1945% to .636% | .05% to .1% | .1945% to .353% | .188% to .553% | n/a means not applicable.
Note:
in this example the third section of the configuration would be intended to remain near the top of the borehole and not be subjected to as large a ΔT as the lower sections (i.e., the first and second sections).
The entire configuration, i.e., all three section are wound on the same spool to form a coil.
The total AFL [L] and AFL [%] are the sums of the individual AFLs for each section.

In FIGS. 9A to 9C there is shown optical fiber configurations having outer protective members 915, 916 and 917 having substantially convex outer geometries. Thus, protective member 915 has a circular outer geometry, protective member 916 has an elliptical outer geometry and protective member 917 has a triangular outer geometry. Moreover these configurations of FIGS. 9A to 9C have fiber bundles 921, 922 and 923, which bundles have multiple fibers. Further, bundle 922 has fibers of different diameters. In FIGS. 10A and 10B there is further shown optical fiber configurations having extreme examples, for illustrative purposes, of outer protective members 918 and 919 having substantially concave outer geometries. These configurations of FIGS. 10A and 10B have fiber bundles 924 and 925. The fibers in these bundles may also be of different diameters.

The forgoing formulas 1 to 12 can be used to determine AFL, for the types of configurations shown in FIGS. 9A-C and 10A-B, with the following modification to the definitions of the factors for the inner radius of the outer protective member, $R_{OPM}$, and the outer radius of the fiber, $R_F$. Thus, for multi-fiber configurations and configurations where the outer protective member is not essentially circular, the $R_{OPM}$ will be the minimum distance from a member of the fiber bundle to the outer protective member, when the moment of inertia of the bundle is located at the center of the largest circle that can be inscribed within the outer protective member, plus the radius of the smallest diameter fiber in the bundle. The $R_F$ is the radius of the smallest diameter fiber in the bundle.

For the example of FIG. 9A the largest circle that can be inscribed would be the inner diameter of the outer protective member 915, i.e., the largest circle would be concentric with the inner diameter of the outer protective member 915.

By way of illustration the $R_{OPM}$ for the configuration of FIG. 9B would be determined as follows. The largest circle 940 that can be inscribed within the internal diameter of the outer protective member 916 is determined. The center 950 of the largest circle 940 is determined. The moment of inertia 960 of the bundle 922 is determined. The fiber bundle 922 and the largest circle 940 are then for computational purposes centered by aligning the circle center 950 and the moment of inertia 960. The $R_{OPM}$ is then equal to the smallest distance between the computationally centered fiber bundle (i.e., when moment 960 and center 950 are aligned) and the outer protective member 916, plus the radius of the smallest diameter fiber in the bundle.

By way of illustration the $R_{OPM}$ for the configuration of FIG. 10A would be determined as follows. The largest circle 942 that can be inscribed within the internal diameter of the outer protective member 918 is determined. The center 952 of the largest circle 942 is determined. The moment of inertia 962 of the bundle 924 is determined. The fiber bundle 924 and the largest circle 942 are then for computational purposes centered by aligning the circle center 952 and the moment of inertia 962. The $R_{OPM}$ is then equal to the smallest distance between the computationally centered fiber bundle (i.e., when moment 962 and center 952 are aligned) and the outer protective member 918 plus the radius of the smallest diameter fiber in the bundle.

Similarly, and by way of illustration the $R_{OPM}$ for the configuration of FIG. 10B would be determined as follows. The largest circle 943 that can be inscribed within the internal diameter of the outer protective member 919 is determined. The center 953 of the largest circle 943 is determined. The moment of inertia 963 of the bundle 925 is determined. The fiber bundle 925 and the largest circle 943 are then for computational purposes centered by aligning the circle center 953 and the moment of inertia 963. Thus, $R_{OPM}$ is equals to the smallest distance between the computationally centered fiber bundle (i.e., when moment 963 and center 953 are aligned) and the outer protective member 919, plus the radius of the smallest diameter fiber in the bundle.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed:

1. An optical fiber configuration for transmitting laser energy over great distances for use in an application, the optical fiber configuration comprising:
   a. an optical fiber, the optical fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$);
   b. an outer protective member around the optical fiber, the outer protective member comprising a first end, a second end, and a length ($L_{OPM}$) defined between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$;
   c. the first and second ends of the outer protective member and the first and second ends of the optical fiber are substantially coterminous;
   d. the optical fiber configuration has a predetermined temperature range for use ($\Delta T$), a predetermined mechanical strain ($\epsilon$), and when the optical fiber is wound into a coil it has a predetermined inner radius of coil ($R_{coil}$);
   e. wherein the $L_F$ is greater than the $L_{OPM}$, so that $L_F - L_{OPM}$ = AFL (additional fiber length);
   f. the optical fiber taking a helical non-following path within the outer protective member; and,
   g. the AFL is equal to or between at least one of: an AFL[L] from Formulas 2 and 4 as defined in Applicants' Specification; or an AFL[%] from Formulas 1 and 3 as defined in Applicants' Specification.

2. The optical fiber configuration of claim 1, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 1 km; $R_{Fmin}$ is at least about 5 cm; and, $R_{coil}$ is at least about 10 cm; wherein the configuration is capable of transmitting a laser beam having at least 1 kW of power, without substantial power loss.

3. The optical fiber configuration of claim 1, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 0.5 km; $R_{Fmin}$ is at least about 5 cm; and, $R_{coil}$ is at least about 10 cm; wherein the configuration is capable of transmitting a high power laser beam over great distances without substantial power loss.

4. The optical fiber configuration of claim 1, wherein the fiber core has a radius greater than about 75 μm.

5. The optical fiber configuration of claim 1, wherein the fiber core has a radius of greater than about 150 μm.

6. The optical fiber configuration of claim 1, wherein the fiber core has a radius of greater than about 300 μm.

7. The optical fiber configuration of claim 1, wherein the fiber has a numeric aperture (NA) of about 0.22.

8. The optical fiber configuration of claim 1, wherein the fiber has a numeric aperture (NA) of at least about 0.17.

9. The optical fiber configuration of claim 1, wherein the $R_{coil}$ is about infinity, whereby the configuration would be substantially straight and not coiled.

10. The optical fiber configuration of claim 1, wherein the $R_{coil}$ is greater than about 1 m.

11. The optical fiber configuration of claim 1, wherein the $R_{coil}$ is less than about 4 m.

12. The optical fiber configuration of claim 1, wherein the outer protective member has a length that is greater than 1 km.

13. The optical fiber configuration of claim 1, wherein in the configuration is capable of transmitting over 1 kW of laser power over 1 km.

14. The optical fiber configuration of claim 1, wherein the configuration is capable of transmitting over 5 kW of laser power over 1 km.

15. The optical fiber configuration of claim 1, wherein the configuration is capable of transmitting over 10 kW of laser power over 1 km.

16. A line structure comprising an optical fiber configuration of claim 12.

17. A wireline comprising an optical fiber configuration of claim 12.

18. A line structure comprising an optical fiber configuration of claim 1.

19. The optical fiber configuration of claim 1, wherein the outer protective member is a tube.

20. The optical fiber configuration of claim 1, wherein the outer protective member is a stainless steel tube.

21. The optical fiber configuration of claim 1, wherein the outer protective member is a wireline.

22. The optical fiber configuration of claim 1, wherein the outer protective member is a line structure.

23. The optical fiber configuration of claim 1, wherein the outer protective member has an outer geometry and the outer geometry is substantially rectangular.

24. The optical fiber configuration of claim 1, wherein the outer protective member has an outer geometry and the outer geometry is substantially triangular.

25. The optical fiber configuration of claim 1, having a plurality of optical fibers.

26. The optical fiber configuration of claim 1, wherein the optical fiber comprises a fiber cladding around the fiber core.

27. The optical fiber configuration of claim 26, wherein the optical fiber comprises a coating around the fiber cladding.

28. The optical fiber configuration of claim 1, wherein the application is cutting a tubular associated with a borehole.

29. The optical fiber configuration of claim 1, wherein the application is the delivery of a high power laser beam to a tool in a borehole.

30. The optical fiber configuration of claim 1, wherein $R_{OPM}$ is from about 1 mm to about 20 mm.

31. The optical fiber configuration of claim 1, wherein $R_{OPM}$ is at least about 1 mm.

32. The optical fiber configuration of claim 1, wherein $R_{OPM}$ is at least about 10 mm.

33. The optical fiber configuration of claim 1, wherein the $R_F$ is at least about 200 μm.

34. The optical fiber configuration of claim 1, wherein the $\Delta T$ is at least about 50° C.

35. An optical fiber configuration for transmitting laser energy over great distances, the optical fiber configuration comprising:
   a. an optical fiber, the fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$);
   b. an outer protective member around the optical fiber, the outer protective member comprising a first end, a second end, and a length ($L_{OPM}$) between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$;

c. the first and second ends of the outer protective member and the first and second ends of the optical fiber are substantially coterminous;

d. wherein the optical fiber configuration has a predetermined temperature range ($\Delta T$), a predetermined mechanical strain ($\epsilon$), and a predetermined inner radius of coil ($R_{coil}$);

e. wherein the $L_F$ is greater than the $L_{OPM}$, so that $L_F - L_{OPM} = AFL$ (additional fiber length);

f. the optical fiber taking a sinusoidal non-following path within the outer protective member; and, g. the AFL is equal to or between at least one of: an AFL[L] from Formulas 9 and 11 as defined in Applicants' Specification; or an AFL[%] from Formulas 8 and 10 as defined in Applicants' Specification.

36. The optical fiber configuration of claim 35, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 1 km; $R_{Fmin}$ is at least about 5 cm; and, $R_{coil}$ is at least about 10 cm; wherein the configuration is capable of transmitting a laser beam having at least 1 kW of power, without substantial power loss.

37. The optical fiber configuration of claim 35, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 0.5 km; $R_{Fmin}$ is at least about 5 cm; and, $R_{coil}$ is at least about 10 cm; wherein the configuration is capable of transmitting a high power laser beam over great distances without substantial power loss.

38. The optical fiber configuration of claim 35, wherein the fiber core has a radius greater than about 75 μm.

39. The optical fiber configuration of claim 35, wherein the fiber core has a radius of greater than about 150 μm.

40. The optical fiber configuration of claim 35, wherein the fiber core has a radius of greater than about 300 μm.

41. The optical fiber configuration of claim 35, wherein the fiber has a numeric aperture (NA) of about 0.22.

42. The optical fiber configuration of claim 35, wherein the fiber has a numeric aperture (NA) of at least about 0.17.

43. The optical fiber configuration of claim 35, wherein the $R_{coil}$ is about infinity.

44. The optical fiber configuration of claim 35, wherein the $R_{coil}$ is greater than about 1 m.

45. The optical fiber configuration of claim 35, wherein the $R_{coil}$ is less than about 4 m.

46. The optical fiber configuration of claim 35, wherein the outer protective member has a length that is greater than 1 km.

47. The optical fiber configuration of claim 35, wherein the configuration is capable of transmitting over 1 kW of laser power over 1 km.

48. The optical fiber configuration of claim 35, wherein the configuration is capable of transmitting over 5 kW of laser power over 1 km.

49. The optical fiber configuration of claim 35, wherein the configuration is capable of transmitting over 10 kW of laser power over 1 km.

50. A line structure comprising an optical fiber configuration of claim 47.

51. A wireline comprising an optical fiber configuration of claim 47.

52. A line structure comprising an optical fiber configuration of claim 35.

53. The optical fiber configuration of claim 35, wherein the outer protective member is a tube.

54. The optical fiber configuration of claim 35, wherein the outer protective member is a stainless steel tube.

55. The optical fiber configuration of claim 35, wherein the outer protective member is a wireline.

56. The optical fiber configuration of claim 35, wherein the outer protective member is a line structure.

57. The optical fiber configuration of claim 35, wherein the outer protective member has an outer geometry and the outer geometry is substantially rectangular.

58. The optical fiber configuration of claim 35, wherein the outer protective member has an outer geometry and the outer geometry is substantially triangular.

59. The optical fiber configuration of claim 35, having a plurality of optical fibers.

60. The optical fiber configuration of claim 35, wherein the optical fiber comprises a fiber cladding around the fiber core.

61. The optical fiber configuration of claim 35, wherein the optical fiber comprises a coating around the fiber cladding.

62. The optical fiber configuration of claim 35, wherein the application is cutting a tubular associated with a borehole.

63. The optical fiber configuration of claim 35, wherein the application is the delivery of a high power laser beam to a tool in a borehole.

64. The optical fiber configuration of claim 35, wherein the mechanical strain is at least about 0.01.

65. The optical fiber configuration of claim 35, wherein the mechanical strain is at least about 0.01.

66. The optical fiber configuration of claim 35, wherein the $R_{Fmin}$ is at least about 5 cm.

67. The optical fiber configuration of claim 35, wherein the $R_{Fmin}$ is at least about 10 cm.

68. The optical fiber configuration of claim 35, wherein the $R_{Fmin}$ is at least about 20 cm.

69. An optical fiber configuration for transmitting laser energy over great distances for use in an application, the optical fiber configuration comprising:

a. an optical fiber, a portion of the optical fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$);

b. an outer protective member around the optical fiber portion, a portion of the outer protective member comprising a first end, a second end, and a length ($L_{OPM}$) defined between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$;

c. the first and second ends of the outer protective member and the first and second ends of the optical fiber are substantially coterminous;

d. the optical fiber configuration has a predetermined temperature range ($\Delta T$), a predetermined mechanical strain ($\epsilon$), and a predetermined inner radius of coil ($R_{coil}$);

e. wherein the $L_F$ is greater than the $L_{OPM}$, so that $L_F - L_{OPM} = AFL$ (additional fiber length);

f. the optical fiber taking a helical non-following path within the outer protective member; and, g. the AFL is equal to or between at least one of: an AFL[L] from Formulas 2 and 4 as defined in Applicants' Specification; or an AFL[%] from Formulas 1 and 3 as defined in Applicants' Specification; and, h. whereby, the optical fiber configuration is capable of transmitting at least about 1 kW of laser energy over great distances without substantial bending losses.

70. The optical fiber configuration of claim 69, wherein: $R_{OPM}$ is at least about 1.0 mm; $R_F$ is at least about 100 µm; the $\Delta T$ is at least about 50° C.; $\lambda$ is at least about 0.01%; $CTE_F$ is at least about $0.5*10^{-6}$ (1/C); $CTE_{OPM}$ is at least about $7*10^{-6}$ (1/C); $L_{OPM}$ is at least about 1 km; $R_{Fmin}$ is at least about 5 cm; and, $R_{coil}$ is at least about 10 cm.

71. The optical fiber configuration of claim 69, wherein: $R_{OPM}$ is at least about 1.0 mm; $R_F$ is at least about 100 µm; the $\Delta T$ is at least about 50° C.; $\lambda$ is at least about 0.01%; $CTE_F$ is at least about $0.5*10^{-6}$ (1/C); $CTE_{OPM}$ is at least about $7*10^{-6}$ (1/C); $L_{OPM}$ is at least about 0.5 km; $R_{Fmin}$ is at least about 5 cm; and, $R_{coil}$ is at least about 10 cm; wherein the configuration is capable of transmitting a high power laser beam over a distance greater than 1 km without substantial power loss.

72. The optical fiber configuration of claim 69, wherein the fiber core has a radius greater than about 75 µm.

73. The optical fiber configuration of claim 69, wherein the fiber core has a radius of greater than about 150 µm.

74. The optical fiber configuration of claim 69, wherein the fiber core has a radius of greater than about 300 µm.

75. The optical fiber configuration of claim 69, wherein the fiber has a Numeric aperture (NA) of about 0.22.

76. The optical fiber configuration of claim 69, wherein the fiber has a Numeric aperture (NA) is at least about 0.15.

77. The optical fiber configuration of claim 69, wherein the $R_{coil}$ is about infinity.

78. The optical fiber configuration of claim 69, wherein the $R_{coil}$ is greater than about 1 m.

79. The optical fiber configuration of claim 69, wherein the $R_{coil}$ is less than about 4 m.

80. The optical fiber configuration of claim 69, wherein the outer protective member has a length that is greater than 1 km.

81. The optical fiber configuration of claim 69, wherein in the configuration is capable of transmitting over 1 kW of laser power over 1 km.

82. A line structure comprising an optical fiber configuration of claim 80.

83. A wireline comprising an optical fiber configuration of claim 80.

84. A line structure comprising an optical fiber configuration of claim 69.

85. The optical fiber configuration of claim 69, wherein the outer protective member is a tube.

86. The optical fiber configuration of claim 69, wherein the outer protective member is a stainless steel tube.

87. The optical fiber configuration of claim 69, wherein the outer protective member is a wireline.

88. The optical fiber configuration of claim 69, wherein the outer protective member is a line structure.

89. The optical fiber configuration of claim 69, wherein the outer protective member has an outer geometry and the outer geometry is substantially rectangular.

90. The optical fiber configuration of claim 69, wherein the outer protective member has an outer geometry and the outer geometry is substantially triangular.

91. The optical fiber configuration of claim 69, having a plurality of optical fibers.

92. The optical fiber configuration of claim 69, wherein the optical fiber comprises a fiber cladding around the fiber core.

93. The optical fiber configuration of claim 69, wherein the optical fiber comprises a coating around the fiber cladding.

94. The optical fiber configuration of claim 69, wherein the application is cutting a tubular associated with a borehole.

95. The optical fiber configuration of claim 69, wherein the application is the delivery of a high power laser beam to a tool in a borehole.

96. The optical fiber configuration of claim 69, wherein the mechanical strain is at least about 0.01.

97. The optical fiber configuration of claim 69, wherein the $R_{Fmin}$ is at least about 5 cm.

98. The optical fiber configuration of claim 69, wherein the $R_{Fmin}$ is at least about 10 cm.

99. The optical fiber configuration of claim 69, wherein the $R_{Fmin}$ is at least about 20 cm.

100. The optical fiber configuration of claim 69, wherein the $R_{OPM}$ is from about 1 mm to about 20 mm.

101. The optical fiber configuration of claim 69, wherein the $R_{OPM}$ is at least about 1 mm.

102. The optical fiber configuration of claim 69, wherein the $R_{OPM}$ is at least about 10 mm.

103. The optical fiber configuration of claim 69, wherein the $R_F$ is at least about 200 µm.

104. The optical fiber configuration of claim 69, wherein the $\Delta T$ is at least about 50° C.

105. An optical fiber configuration for transmitting laser energy over great distances for use in an application, the optical fiber configuration comprising:
a. an optical fiber, a portion of the fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$);
b. an outer protective member around the optical fiber portion, a portion of the outer protective member comprising a first end, a second end, and a length ($L_{OPM}$) between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$;
c. the first and second ends of the outer protective member and the first and second ends of the optical fiber are substantially coterminous;
d. wherein the optical fiber configuration has a predetermined temperature range ($\Delta T$), a predetermined mechanical strain ($\epsilon$), and a predetermined inner radius of coil ($R_{coil}$);
e. wherein the $L_F$ is greater than the $L_{OPM}$, so that $L_F - L_{OPM} = AFL$ (additional fiber length);
f. the optical fiber taking a sinusoidal non-following path within the outer protective member;
g. the AFL is equal to or between at least one of: an AFL[L] from Formulas 9 and 11 as defined in Applicants' Specification; or an AFL[%] from Formulas 8 and 10 as defined in Applicants' Specification; and,
h. whereby, the optical fiber configuration is capable of transmitting at least about 1 kW of laser energy over great distances without substantial bending losses.

106. The optical fiber configuration of claim 105, wherein: $R_{OPM}$ is at least about 1.0 mm; $R_F$ is at least about 100 µm; the $\Delta T$ is at least about 50° C.; $\lambda$ is at least about 0.01%; $CTE_F$ is at least about $0.5*10^{-6}$ (1/C); $CTE_{OPM}$ is at least about $7*10^{-6}$ (1/C); $L_{OPM}$ is at least about 1 km; $R_{Fmin}$ is at least about 5 cm; and, $R_{coil}$ is at least about 10 cm.

107. The optical fiber configuration of claim 105, wherein: $R_{OPM}$ is at least about 1.0 mm; $R_F$ is at least about 100 µm; the $\Delta T$ is at least about 50° C.; $\lambda$ is at least about 0.01%; $CTE_F$ is at least about $0.5*10^{-6}$ (1/C); $CTE_{OPM}$ is at least about $7*10^{-6}$ (1/C); $L_{OPM}$ is at least about 0.5 km; $R_{Fmin}$ is at least about 5 cm; and, $R_{coil}$ is at least about 10 cm; wherein the configuration is capable of transmitting a high power laser beam over a distance greater than 1 km without substantial power loss.

108. The optical fiber configuration of claim 105, wherein the fiber core has a radius greater than about 75 μm.

109. The optical fiber configuration of claim 105, wherein the fiber core has a radius of greater than about 150 μm.

110. The optical fiber configuration of claim 105, wherein the fiber core has a radius of greater than about 300 μm.

111. The optical fiber configuration of claim 105, wherein the fiber has a numeric aperture (NA) of about 0.22.

112. The optical fiber configuration of claim 105, wherein the fiber has a numeric aperture (NA) is at least about 0.15.

113. The optical fiber configuration of claim 105, wherein the $R_{coil}$ is about infinity.

114. The optical fiber configuration of claim 105, wherein the $R_{coil}$ is greater than about 1 m.

115. The optical fiber configuration of claim 105, wherein the $R_{coil}$ is less than about 4 m.

116. The optical fiber configuration of claim 105, wherein the outer protective member has a length that is greater than 1 km.

117. The optical fiber configuration of claim 105, wherein in the configuration is capable of transmitting over 1 kW of laser power over 1 km.

118. A line structure comprising an optical fiber configuration of claim 117.

119. A wireline comprising an optical fiber configuration of claim 117.

120. A line structure comprising an optical fiber configuration of claim 105.

121. The optical fiber configuration of claim 105, wherein the outer protective member is a tube.

122. The optical fiber configuration of claim 105, wherein the outer protective member is a stainless steel tube.

123. The optical fiber configuration of claim 105, wherein the outer protective member is a wireline.

124. The optical fiber configuration of claim 105, wherein the outer protective member is a line structure.

125. The optical fiber configuration of claim 105, wherein the outer protective member has an outer geometry and the outer geometry is substantially rectangular.

126. The optical fiber configuration of claim 105, wherein the outer protective member has an outer geometry and the outer geometry is substantially triangular.

127. The optical fiber configuration of claim 105, having a plurality of optical fibers.

128. The optical fiber configuration of claim 105, wherein the optical fiber comprises a fiber cladding around the fiber core.

129. The optical fiber configuration of claim 105, wherein the optical fiber comprises a coating around the fiber cladding.

130. The optical fiber configuration of claim 105, wherein the application is cutting a tubular associated with a borehole.

131. The optical fiber configuration of claim 105, wherein the application is the delivery of a high power laser beam to a tool in a borehole.

132. The optical fiber configuration of claim 105, wherein the mechanical strain is at least about 0.01%.

133. The optical fiber configuration of claim 105, wherein the $R_{Fmin}$ is at least about 5 cm.

134. The optical fiber configuration of claim 105, wherein the $R_{Fmin}$ is at least about 10 cm.

135. The optical fiber configuration of claim 105, wherein the $R_{Fmin}$ is at least about 20 cm.

136. The optical fiber configuration of claim 105, wherein the $R_{OPM}$ is from about 1 mm to about 20 mm.

137. The optical fiber configuration of claim 105, wherein the $R_{OPM}$ is at least about 1 mm.

138. The optical fiber configuration of claim 105, wherein the $R_{OPM}$ is at least about 10 mm.

139. The optical fiber configuration of claim 105, wherein the $R_F$ is at least about 200 μm.

140. The optical fiber configuration of claim 105, wherein the $\Delta T$ is at least about 50° C.

141. An optical fiber configuration for reducing bending losses for use in an application, the optical fiber configuration comprising:
   a. an optical fiber;
   b. the optical fiber comprising a fiber core, the fiber core having a diameter of at least about 100 μm, the optical fiber having a first total length;
   c. an outer protective member in association with the optical fiber, and the outer protective member having a second total length, wherein the first total length and the second total length are different; and,
   d. a means for simultaneously providing a benefit of additional fiber length and minimal bending looses.

142. The optical fiber configuration of claim 141, comprising a plurality of optical fibers.

143. The optical fiber configuration of claim 141, comprising a plurality of optical fibers and wherein the outer protective member has a substantially convex outer geometry.

144. The optical fiber configuration of claim 141, comprising a plurality of optical fibers and wherein the outer protective member has a substantially concave outer geometry.

145. The optical fiber configuration of claim 141, wherein the configuration is capable of transmitting laser energy greater than about 5 kW, over distances greater than about 1 km without substantial power loss.

146. The optical fiber configuration of claim 141, wherein the configuration is capable of transmitting laser energy greater than about 10 kW, over distances greater than about 1 km without substantial power loss.

147. The optical fiber configuration of claim 141, wherein the additional fiber length benefit comprises accommodating the coiling and uncoiling of the configuration.

148. The optical fiber configuration of claim 141, wherein the additional fiber length benefit comprises accommodating a difference in tensile strength between the optical fiber and the outer protective member.

149. The optical fiber configuration of claim 141, wherein the additional fiber length benefit comprises accommodating a difference in deformation between the optical fiber and the outer protective member.

150. The optical fiber configuration of claim 141, wherein the additional fiber length benefit comprises holding the optical fiber within the outer protective member.

151. The optical fiber configuration of claim 141, wherein the additional fiber length benefit comprises reducing rattling of the optical fiber within the outer protective member.

152. The optical fiber configuration of claim 141, wherein the additional fiber length benefit comprises providing a means for attaching tools, fibers, couplers, or connectors to the optical fiber.

153. A line structure for an application, which application has predetermined factors associated therewith, the line structure comprising an optical fiber configuration, the optical fiber configuration comprising:
   a. an optical fiber, a portion of the optical fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$);

b. an outer protective member around the optical fiber portion, a portion of the outer protective member comprising a first end, a second end, and a length ($L_{OPM}$) defined between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$;

c. the first and second ends of the outer protective member and the first and second ends of the optical fiber are substantially coterminous;

d. the optical fiber configuration has a predetermined temperature range ($\Delta T$), a predetermined mechanical strain ($\epsilon$), and a predetermined inner radius of coil ($R_{coil}$);

e. wherein the $L_F$ is greater than the $L_{OPM}$, so that $L_F - L_{OPM} = AFL$ (additional fiber length);

f. the optical fiber taking a helical non-following path within the outer protective member; and, g. the AFL is equal to or between at least one of: an AFL[L] from Formulas 2 and 4 as defined in Applicants' Specification; or an AFL[%] from Formulas 1 and 3 as defined in Applicants' Specification.

154. The line structure of claim 153, wherein the line structure is a wire line.

155. The line structure of claim 153 comprising a plurality of optical fiber configurations.

156. The line structure of claim 153 comprising a plurality of optical fibers.

157. The line structure of claim 153, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 1 km; $R_{Fmin}$ is at least about 5 cm; and, $R_{coil}$ is at least about 10 cm; wherein the configuration is capable of transmitting a laser beam having at least 1 kW of power, without substantial power loss.

158. The line structure of claim 153, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 0.5 km; $R_{Fmin}$ is at least about 5 cm; and, $R_{coil}$ is at least about 10 cm; wherein the configuration is capable of transmitting a high power laser beam over great distances without substantial power loss.

159. A line structure for an application, which application has predetermined factors associated therewith, the line structure comprising an optical fiber configuration, the optical fiber configuration comprising:

a. an optical fiber, a portion of the fiber comprising a first end, a second end, a length ($L_F$) defined between the first and second optical fiber ends, and a fiber core, wherein the optical fiber has an outer radius ($R_F$), a coefficient of thermal expansion ($CTE_F$), and a minimum bend radius ($R_{Fmin}$);

b. an outer protective member around the optical fiber portion, a portion of the outer protective member comprising a first end, a second end, and a length ($L_{OPM}$) between the first and second outer protective member ends at ambient temperature and with no mechanical strain, wherein the outer protective member has an inner radius ($R_{OPM}$), a coefficient of thermal expansion ($CTE_{OPM}$), and the $R_{OPM}$ is greater than the $R_F$;

c. the first and second ends of the outer protective member and the first and second ends of the optical fiber are substantially coterminous;

d. wherein the optical fiber configuration has a predetermined temperature range ($\Delta T$), a predetermined mechanical strain ($\epsilon$), and a predetermined inner radius of coil ($R_{coil}$);

e. wherein the $L_F$ is greater than the $L_{OPM}$, so that $L_F - L_{OPM} = AFL$ (additional fiber length);

f. the optical fiber taking a sinusoidal non-following path within the outer protective member; and, g. the AFL is equal to or between at least one of: an AFL[L] from Formulas 9 and 11 as defined in Applicants' Specification; or an AFL[%] from Formulas 8 and 10 as defined in Applicants' Specification.

160. The line structure of claim 159, wherein the line structure is a wireline.

161. The line structure of claim 159, comprising a plurality of optical fiber configurations.

162. The line structure of claim 159 comprising a plurality of optical fibers.

163. The line structure of claim 159, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 1 km; $R_{Fmin}$ is at least about 5 cm; and, $R_{coil}$ is at least about 10 cm; wherein the configuration is capable of transmitting a laser beam having at least 1 kW of power without substantial power loss.

164. The line structure of claim 159, wherein: $R_{OPM}$ is at least about 1.0 mm; $R_F$ is at least about 100 μm; the $\Delta T$ is at least about 50° C.; $\epsilon$ is at least about 0.01%; $CTE_F$ is at least about $0.5*10^{-6}$ (1/C); $CTE_{OPM}$ is at least about $7*10^{-6}$ (1/C); $L_{OPM}$ is at least about 0.5 km; $R_{Fmin}$ is at least about 5 cm; and, $R_{coil}$ is at least about 10 cm; wherein the configuration is capable of transmitting a high power laser beam over great distances without substantial power loss.

165. An optical fiber configuration for an application, the optical fiber configuration comprising selected predetermined factors for the application, the optical fiber configuration comprising:

a. an optical fiber, a portion of the fiber comprising a first end, a second end, a length between the first and second ends;

b. the fiber portion comprising a core, a cladding, and a coating, and an outside diameter;

c. the optical fiber capable of transmitting high power laser energy over great distances;

d. the core comprising a diameter of greater than or equal to about 150 μm;

e. an outer protective member around the optical fiber portion, a portion of the outer protective member comprising a first end, a second end, a length between the first and second ends and an internal diameter;

f. the outer protective member internal diameter greater than the fiber outside diameter;

g. the ends of the outer protective member portion and the fiber portion substantially coterminous;

h. the fiber length greater than the outer protective member length, the difference in lengths comprising an additional fiber length (AFL) within the outer protective member portion;

i. the AFL less than an amount where bending losses in the optical fiber from the fiber configuration prevent the transition of high power laser energy over great distances without substantial bending losses; and, j. the AFL greater than the minimum AFL needed to avoid damage from the application.

166. An optical fiber configuration for reducing bending losses associated with the presence of additional fiber length in the configuration comprising:
   a. an optical fiber comprising a core, the core comprising a diameter that is equal to or greater than 300 µm, and the fiber comprising a total length;
   b. a protective member around the optical fiber;
   c. the protective member comprising a length that is greater than 500 meters and that is shorter than the total fiber length, whereby there is a difference in length between the total fiber length and the protective member length;
   d. at least a portion of the fiber comprising a non-following fiber path within the protective member;
   e. the majority of the difference in length taken up by the non-following fiber path; and, f. the non-following fiber path configured such that it does not contribute to bending losses, whereby the optical fiber configuration is capable of transmitting at least about 1 kW of laser energy over great distances without substantial bending losses.

167. The optical fiber configuration of claim 166, wherein the configuration is capable of transmitting at least about 5 kW of laser energy.

168. The optical fiber configuration of claim 166, wherein the configuration is capable of transmitting at least about 10 kW of laser energy.

169. The optical fiber configuration of claim 166, wherein the onfiguration is capable of transmitting at least about 20 kW of laser energy.

170. A method for making an optical fiber configuration, which configuration comprises an optical fiber comprising a total length and an outer protective member comprising a length, the method comprising:
   a. selecting a value for an inner radius of the outer protective member, $R_{OPM}$.
   b. selecting a value for an outer radius of the fiber, $R_F$.
   c. selecting a value for a temperature change that the configuration is capable of withstanding, $\Delta T$;
   d. selecting a value for a mechanical strain that the configuration is capable of withstanding, $\epsilon$;
   e. selecting a value for the coefficient of thermal expansion of the fiber, $CTE_F$;
   f. selecting a value for a coefficient of thermal expansion of the outer protective member, $CTE_{OPM}$;
   g. selecting a value for a length of outer protective member at ambient temperature and no mechanical strain, $L_{OPM}$;
   h. selecting a value for a minimum bend radius of the fiber, $R_{Fmin}$;
   i. selecting a value for an inner radius of a coil of the configuration, $R_{coil}$;
   j. selecting that the fiber will have a helical non-following path within the outer protective member; and,
   k. using the selected values of steps a. to i. determining a maximum AFL[L] using formula 2 as defined in Applicants' Specification and a minimum AFL[L] using formula 4 as defined in Applicants' Specification; and,
   l. configuring the optical fiber configuration in accordance with the maximum and minimum AFL[L]s of step k, such that the total fiber length is between the maximum and minimum determined AFL[L]s.

171. A method for making an optical fiber configuration, which configuration comprises an optical fiber comprising a total length and an outer protective member comprising a length, the method comprising:
   a. selecting a value for an inner radius of the outer protective member, $R_{OPM}$.
   b. selecting a value for an outer radius of the fiber, $R_F$.
   c. selecting a value for a temperature change that the configuration is capable of withstanding, $\Delta T$;
   d. selecting a value for a mechanical strain that the configuration is capable of withstanding, $\epsilon$;
   e. selecting a value for the coefficient of thermal expansion of the fiber, $CTE_F$;
   f. selecting a value for a coefficient of thermal expansion of the outer protective member, $CTE_{OPM}$;
   g. selecting a value for a length of outer protective member at ambient temperature and no mechanical strain, $L_{OPM}$;
   h. selecting a value for a minimum bend radius of the fiber, $R_{Fmin}$;
   i. selecting a value for an inner radius of a coil of the configuration, $R_{coil}$;
   j. selecting that the fiber will have a sinusoidal non-following path within the outer protective member; and,
   k. using the selected values of steps a. to i. determining a maximum AFL[L] using formula 9 as defined in Applicants' Specification and a minimum AFL[L] using formula 11 as defined in Applicants' Specification; and,
   l. configuring the optical fiber configuration in accordance with the maximum and minimum AFL[L]s of step k, such that the total fiber length is between the maximum and minimum determined AFL[L]s.

172. A method for making an optical fiber configuration, which configuration comprises an optical fiber comprising a total length and an outer protective member comprising a length, the method comprising:
   a. selecting a value for an inner radius of the outer protective member, $R_{OPM}$.
   b. selecting a value for an outer radius of the fiber, $R_F$.
   c. selecting a value for a temperature change that the configuration is capable of withstanding, $\Delta T$;
   d. selecting a value for a mechanical strain that the configuration is capable of withstanding, $\epsilon$;
   e. selecting a value for the coefficient of thermal expansion of the fiber, $CTE_F$;
   f. selecting a value for a coefficient of thermal expansion of the outer protective member, $CTE_{OPM}$;
   g. selecting a value for a length of outer protective member at ambient temperature and no mechanical strain, $L_{OPM}$;
   h. selecting a value for a minimum bend radius of the fiber, $R_{Fmin}$;
   i. selecting a value for an inner radius of a coil of the configuration, $R_{coil}$;
   j. selecting that the fiber will have a helical non-following path within the outer protective member; and
   k. using the selected values of steps a. to i. determining a maximum AFL[%] using formula 1 as defined in Applicants' Specification and a minimum AFL[%] using formula 3 as defined in Applicants' Specification; and,
   l. configuring the optical fiber configuration in accordance with the maximum and minimum AFL[%]s of step k, such that the total fiber length is between the maximum and minimum determined AFL[%]s.

173. A method for making an optical fiber configuration, which configuration comprises an optical fiber comprising a total length and an outer protective member comprising a length, the method comprising:
   a. selecting a value for an inner radius of the outer protective member, $R_{OPM}$.
   b. selecting a value for an outer radius of the fiber, $R_F$.
   c. selecting a value for a temperature change that the configuration is capable of withstanding, $\Delta T$;

d. selecting a value for a mechanical strain that the configuration is capable of withstanding, $\epsilon$;
e. selecting a value for the coefficient of thermal expansion of the fiber, $CTE_F$;
f. selecting a value for a coefficient of thermal expansion of the outer protective member, $CTE_{OPM}$;
g. selecting a value for a length of outer protective member at ambient temperature and no mechanical strain, $L_{OPM}$;
h. selecting a value for a minimum bend radius of the fiber, $R_{Fmin}$;
i. selecting a value for an inner radius of a coil of the configuration, $R_{coil}[L]$;
j. selecting that the fiber will have a sinusoidal non-following path within the outer protective member; and,
k. using the selected values of steps a. to i. determining a maximum AFL[%] using formula 8 as defined in Applicants' Specification and a minimum AFL[%] using formula 10 as defined in Applicants' Specification; and,
l. configuring the optical fiber configuration in accordance with the maximum and minimum AFL[%]s of step k, such that the total fiber length is between the maximum and minimum determined AFL[%]s.

174. An optical fiber configuration for transmitting laser energy over great distances for use in an application, the optical fiber configuration comprising:
an optical fiber, the optical fiber comprising a first end, a second end, and a length ($L_F$) defined between the first and second optical fiber ends that is greater than approximately 500 m,
an outer protective member around the optical fiber, the outer protective member comprising a first end, a second end, and a length ($L_{OPM}$) defined between the first and second outer protective member ends;
wherein the LE is greater than the $L_{OPM}$ and,
the optical fiber and outer protective member configured so that when high power laser energy is directed from the first optical fiber end to the second fiber end there is not substantial loss of power of the high power laser energy at the second optical fiber end when compared with initial power of the high power laser energy entering the first optical fiber end.

175. The optical fiber configuration of claim 174, wherein the first and second ends of the outer protective member and the first and second ends of the optical fiber are substantially coterminous.

176. The optical fiber configuration of claim 174, wherein the optical fiber takes a helical non-following path within the outer protective member.

177. The optical fiber configuration of claim 175, wherein the optical fiber takes a helical non-following path within the outer protective member.

178. The optical fiber configuration of claim 174, wherein the optical fiber takes a sinusoidal non-following path within the outer protective member.

179. The optical fiber configuration of claim 175, wherein the optical fiber takes a sinusoidal non-following path within the outer protective member.

180. An optical fiber configuration for reducing bending losses for use in an application, the optical fiber configuration comprising:
a. an optical fiber;
b. the optical fiber comprising a fiber core, the fiber core having a diameter of at least about 100 μm;
c. an outer protective member in association with the optical fiber;
d. a means for providing a benefit of additional fiber length; and,
e. wherein the optical fiber configuration is capable of transmitting laser energy greater than about 5 kW, over distances greater than about 1 km without substantial power loss.

181. An optical fiber configuration for reducing bending losses for use in an application, the optical fiber configuration comprising:
a. an optical fiber;
b. the optical fiber comprising a fiber core, the fiber core having a diameter of at least about 100 μm;
c. an outer protective member in association with the optical fiber;
d. a means for providing a benefit of additional fiber length; and,
e. wherein the optical fiber configuration is capable of transmitting laser energy greater than about 10 kW, over distances greater than about 1km without substantial power loss.

* * * * *

UNITED STATES PATENT AND TRADEMARK OFFICE
CERTIFICATE OF CORRECTION

PATENT NO. : 8,571,368 B2  
APPLICATION NO. : 12/840978  
DATED : October 29, 2013  
INVENTOR(S) : Charles Rinzler and Mark Zediker Page 1 of 2

It is certified that error appears in the above-identified patent and that said Letters Patent is hereby corrected as shown below:

In the Claims

Claim 75, Column 23, line 26, delete "Numeric" and insert -- numeric --

Claim 76, Column 23, line 28, delete "Numeric" and insert -- numeric --

Claim 103, Column 24, line 19, delete "$R_E$" and insert -- $R_F$ --

Claim 141, Column 26, line 19, delete "and"

Claim 141, Column 26, line 23, delete "looses." and insert -- losses. --

Claim 163, Column 28, line 23, delete "$R_O p_M$" and insert -- $R_{OPM}$ --

Claim 163, Column 28, line 25, delete "50° C." and insert -- 50° C --

Claim 164, Column 28, line 33, delete "50° C." and insert -- 50° C --

Claim 166, Column 29, lines 17-23, delete:

"e. the majority of the difference in length taken up by the non-following fiber path; and,
f. the non-following fiber path configured such that it does not contribute to bending losses, whereby the optical fiber configuration is capable of transmitting at least a 1 kW of laser energy over great distances without substantial bending losses."

insert:
-- e. the majority of the difference in length taken up by the non-following fiber path; and, f. the non-following fiber path configured such that it does not contribute to bending Signed and Sealed this  
Eleventh Day of March, 2014

Michelle K. Lee  
*Deputy Director of the United States Patent and Trademark Office* losses, whereby the optical fiber configuration is capable of transmitting at least a 1 kW of laser energy over great distances without substantial bending losses. --